United States Patent [19]
Dennis

[11] Patent Number: 5,337,258
[45] Date of Patent: Aug. 9, 1994

[54] COST METRICS

[75] Inventor: Stephen V. Dennis, Bothell, Wash.

[73] Assignee: Microsoft Corporation, Redmond, Wash.

[21] Appl. No.: 912,098

[22] Filed: Jul. 10, 1992

[51] Int. Cl.⁵ .............................................. G06F 11/34
[52] U.S. Cl. ................................ 364/551.01; 395/575
[58] Field of Search ............ 364/550, 551.01, DIG. 1; 395/575

[56] References Cited

U.S. PATENT DOCUMENTS

| | | | |
|---|---|---|---|
| 3,426,331 | 2/1969 | Joyce | 395/575 |
| 4,355,389 | 10/1982 | Sato et al. | 371/18 |
| 4,845,615 | 7/1989 | Blasciak | 395/400 |
| 4,881,180 | 11/1989 | Nishiyama | 364/518 |
| 4,905,171 | 2/1990 | Kiel et al. | 364/551.01 |
| 4,933,941 | 6/1990 | Eckard et al. | 371/18 |
| 5,103,394 | 4/1992 | Blasciak | 395/575 |
| 5,161,116 | 11/1992 | Schneider et al. | 364/551.01 |
| 5,218,676 | 6/1993 | Ben-Ayed et al. | 395/200 |
| 5,255,368 | 10/1993 | Barry | 395/200 |

FOREIGN PATENT DOCUMENTS

| | | |
|---|---|---|
| 0452115 | 10/1991 | European Pat. Off. |
| 0467598 | 1/1992 | European Pat. Off. |
| 0470782 | 2/1992 | European Pat. Off. |
| 0474153 | 3/1992 | European Pat. Off. |
| 0478338 | 4/1992 | European Pat. Off. |
| 0480593 | 4/1992 | European Pat. Off. |

*Primary Examiner*—Edward R. Cosimano
*Attorney, Agent, or Firm*—Seed and Berry

[57] ABSTRACT

A resource oriented host computer-printer system is disclosed in which the host computer and printer share information and data processing duties. A system and method for analyzing the execution times for draw primitives allows the host computer to determine whether the printer will be able to render draw primitives in real-time. The inventive system sends a series of test instructions to the printer at the time the printers is installed on the host computer. A timer is used to time a predetermined period of time during which the draw primitives are sent to the printer for execution. Based on the number of draw primitives executed and the type of draw primitives executed, the system constructs a printer model. A log file is used to store the acquired cost metric data. In one embodiment of the invention, a clumping procedure is used to classify cost metric data. A series of cost tables stores the classified cost metric data. A map table provides a map to the cost table to speed up the process of cost metric data retrieval. At run time, a resource assembler calculates the cost of executing each draw primitive within a band to determine if the printer can render the draw primitive in real-time. If the band is too complex for the printer to render in real-time, the host computer will render the band and transmit the bit-map of that band to the printer. If too many bands on one page are complex, the host computer may render the entire page and transmit the bit-map for all bands on the page.

75 Claims, 11 Drawing Sheets

Selected Load-Balancing Options

COST METRICS

TECHNICAL FIELD

The present invention relates to a system and method for printing with computer systems.

BACKGROUND OF THE INVENTION

Computer systems are highly useful for compiling and processing large amounts of data. Modern computer system often include graphics capabilities that allow the display and printing of graphic images. Printing a page of text and/or graphics images requires the conversion of data from the format used on a host computer to a format used by the particular printer selected. Typically, the computer data is translated into a bit-map data file where each bit represents a dot on the printed page. The bit-map is usually generated within the host computer and transferred to the printer in compressed data format. The compressed bit-map is expanded in the printer and transferred to a print engine, which is the portion of the printer that controls the paper movement, toner, and mechanical drive system which moves the paper, as well as the electronic circuitry which controls the printing process. The print engine receives the bit-map data and converts it into the appropriate voltages to create a printed image.

The printed page is comprised of individual dots, called pixels. On a typical laser printer, there may be 300, 600, or more pixels per inch. Each pixel is usually represented by a single data bit in the printer memory. As the laser print engine scans a line, the data bits corresponding to that line are read and the laser beam turns on or off depending on the logic level of the data bit stored in that memory location. At a resolution of 300 pixels per inch, a printer requires approximately one megabyte of memory to store the bit-map data file for an entire page. Some laser printers contain large memories and operate in a page mode, which means that the printer can store an entire page of data in bit-map form. Because of the large amount of memory required to store an entire page in bit-map form, some printers use a banding mode to reduce the amount of memory required. A printer with banding mode capability breaks the printed page down into a number of horizontal segments called bands. The printer accepts the bit-map data for only one band at a time thus reducing the memory requirement. When the printer has processed the data for the first band, it can accept data for the second band and so forth. For example, if the printed page is broken down into four bands, the memory requirements are reduced by a factor of four because the printer need only store the bit-map data for one fourth of the page.

Designing a computer-printer system involves the achievement of two basic goals. The first goal is that of device independence. In an effort to make the printer independent of system constraints of any particular host computer, manufacturers and programmers design printer drivers that attempt to be universal. If there is true device independence, the host computer does not need to know what type of printer is connected to the printer interface. The host computer typically transmits data to the printer system through a hardware interface such as a serial I/O port or a parallel printer I/O port. Prior art computer-printer systems attempt to achieve device independence by minimizing the host's knowledge of a particular attached printer and relying instead on a rather abstract data stream. As a result, transfer and processing of the data stream is often slowed to an inefficient pace, and throughput suffers.

As an example, a host computer may download a first character font set required for several pages of a document. Typically, computer systems of the prior art download an entire font even when only a few characters are needed for a particular printing task. The host computer will download an entire second character font set when the second font set (or part of the second font set) is needed. The second font set may be written into the memory space occupied by the first font set even though there may be room within the printer memory to retain the first font set for use when printing subsequent pages requiring the first font set. There is no communication from the printer to the host computer to advise the host computer of the current status of the printer resources.

The second goal is optimum performance of the printing process. Laser printers range from simple stand-alone printers coupled to a single computer and processing one or two pages of paper at a time to sophisticated printers with multiple paper trays and complex paper pathways coupled to a computer network and simultaneously processing many pages for multiple users. Computer systems must be capable of operating effectively with any type of printer.

Unfortunately, these first and second goals may come into conflict. The trade-off for attempting universal compatibility is that computer-printer systems are often extremely slow in processing data. Furthermore, host computers do have some awareness of the printer to which they are connected. Ironically, in an attempt to achieve these two goals, present computer-printer systems fail to achieve either goal. The host computer is aware of the type of printer to which it is connected, and yet the "universal" printer driver approach results in a slow, inefficient system where the host computer and printer often spend valuable computing time resolving conflicts that may not arise, such as page error recovery, rather than performing useful tasks. For example, prior art computer-printer systems retain the bit-map data file for an entire page until the printed page clears the last jam sensor on the laser printer. In the event that a page jams, the data is available and the page can quickly be reprinted. However, paper jams occur relatively infrequently in the printing process. Once the print engine begins to print a page, it takes approximately ten seconds for the page to clear the last jam sensor. The overall printing process is slowed significantly by waiting an extra ten seconds for each page to clear the last jam sensor before clearing the bit-map data file from the printer memory and processing the next page.

Prior art systems also delay feeding paper to the print engine until the entire page has been described because the selection of paper size may be made at any time during the page description. For example, the host computer could transfer a description of the entire page and the final description line could be the selection of letter size paper. There is no need to delay the paper feeding if the user is required to select the paper size at the beginning of the page description. Few, if any, print tasks are hampered by this requirement. The user generally knows the paper size and the print mode (i.e., simplex or duplex) before the print process begins. Therefore, prior art systems waste valuable time by providing an unnecessary option.

Currently used printer languages have evolved from the printer languages used with dot matrix printers. While dot matrix printers are still in use, the use of laser printers is widespread and growing. Yet, the printer languages have attempted to deal with the increased use of laser printers by making minor modifications to printer languages oriented to the slower dot matrix printers. This evolutionary approach does not take advantage of the potential computing power available in laser printers.

The system architecture of prior art computer-printer systems has changed very little even though the printer hardware has evolved from simple "dumb" printers to sophisticated laser printers controlled by microprocessors. A typical prior art computer-laser printer system 2, shown in FIG. 1 where an application program 4, running on a host computer 6, generates data to be printed. The data is converted to a compressed bitmap by a printer driver 8 within the host computer 6. A typical prior art printer 10 known as a parser. The parser 12 accepts bytes of data from the host computer 6 and organizes the bytes of data into tokens. Tokens are streams of data that are associated in a meaningful lexical context. For example, a data stream may be a binary bit-map transmitted in a compressed data format. The binary data is usually accompanied by a header and trailer instructing the parser how to process the data. The header/trailer are transmitted in ASCII bytes, each of which must be processed by the parser 12. The parser must accept and process every ASCII data byte, one byte at a time. As a result, the parser 12 is a bottleneck to efficient data flow in a computer-printer system 2.

The parser 12 processes every byte of data received by the printer 10 and creates a display list within a memory in the printer. The display list is sorted by virtue of where the object is located on the page. Bitmaps in the display list 14 are generally stored in an uncompressed format. Other objects such as text are rather brief. Therefore, a single, simple rectangle running around the circumference of the page will generally require one megabyte of storage. An imager 16 translates the display list 14 into a bit-map data file suitable for the print engine. The bit-map data file is stored in a frame buffer 18 and transmitted to the print engine 20.

Another area in which prior art computer-printer systems are inefficient is that pages are often processed in an inefficient order. If the printer is operating in the duplex mode (printing on both side of the page), the paper pathway taken by the page within the printer demands that side two of a page be printed before side one. However, prior art computer-printer systems demand that side one of a page be processed before side two. This means that side one of the page be processed completely and stored within the printer memory as a bit-map data file. Then, side two of the page is completely processed and sent to the print engine. The philosophy in prior art systems is that the user expects side one to be processed first. However, the user really only expects that the pages will appear in the proper order in the printer tray when the document is completely printed. There is no practical reason that the host computer should process the pages in any order other than the order in which the pages will actually be printed by the printer.

As noted above, prior art systems also fail to use the potential computing power available in modern laser printers. The older design dumb printers were little more than a data buffer and a print engine. The data processing was all done by the host computer and the printer printed the dot matrix data. Modern laser printers are microprocessor controlled and have computing power that may even equal that of the host computer. Prior art systems still tend to treat the printer as a dumb printer without the capability of performing any data processing. This is due, in part, to the attempt to achieve device independence, as described above. Other prior art systems give the printer responsibility for virtually all data processing. The result is that the combined computing power of the host computer and the printer is not utilized efficiently, and the overall printing process is slowed to an inefficient pace.

Because there is little communication between the host computer and the printer, the host computer and printer cannot effectively share the task of data processing. Prior art host computers generally perform virtually all of the data processing or virtually none of the data processing.

The attempts to achieve device independence and universal operation with all types of printers results in an inefficient printing process in which potential computing power is untapped and resources are wasted because the host computer and printer do not communicate effectively with each other. Therefore, it can be appreciated that there is a significant need for a computer-printer system that allows effective communication between the host computer and the printer, and maximizes utilization of resources.

SUMMARY OF THE INVENTION

The inventive system is embodied in a host-computer printer system containing a timer and evaluator to determine the execution time for a selected set of instructions. From the execution times, a printer model is constructed to predict the execution time for any of a set of instructions. The accumulated data is stored in a log file and used by a resource assembler to calculate the cost of executing a set of user-specified instructions. Based on the cost calculations, the resource assembler determines if the printer can execute the user-specified instructions in real-time.

In an alternative embodiment, the data contained in the log files is classified to reduce the number of data entries. The classified data is stored in a set of cost tables. A set of map tables simplifies access to the cost tables.

The inventive system may predetermine the cost metrics data and provide a small binary data file linked to the resource assembler. Alternatively, the cost data can be determined and linked to the resource assembler at the time of installation of the printer on the computer.

DETAILED DESCRIPTION OF THE INVENTION

Figure 1:
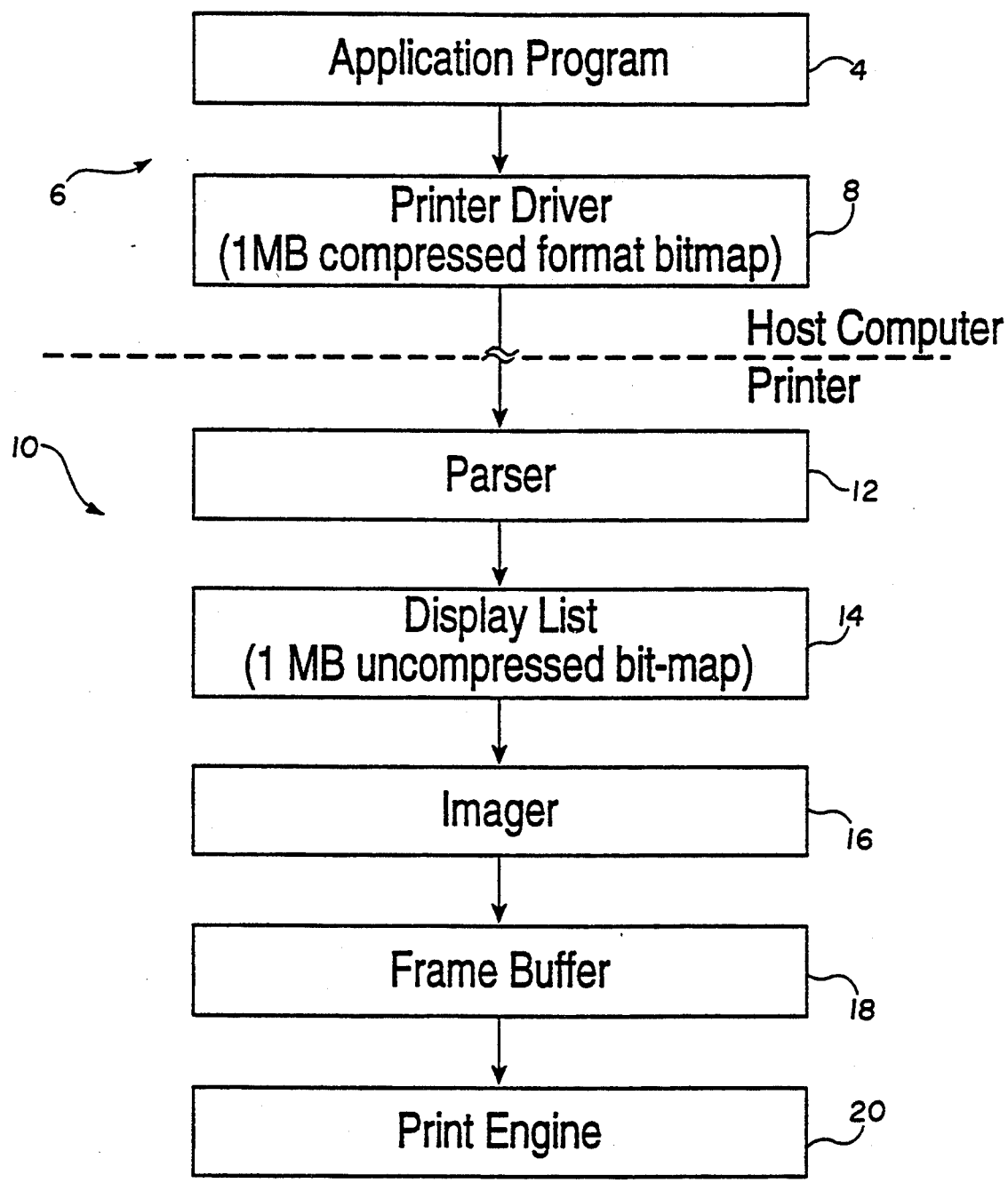
FIG. 1 depicts a typical prior art computer-laser printer system.

The present invention takes a revolutionary approach to host computer-printer interaction. It allows the cooperative effort of the host computer and the printer to dramatically increase the print speed of the printing process and decrease the return to application time. Return to application time is the time that the host computer requires to process a printing job and return to the application program that initiated the printing. Many prior art computer-printer systems are designed to execute computer code, rather than print pages. That is, the printer receives, translates, and executes code with the page being printed as a by-product of the code execution. Many systems of the prior art execute a large amount of code to print a single page.

As described above, prior art systems do not have an effective dialog between the host computer and the printer. Thus, the sophisticated computing capability of the modern printer is not utilized. In contrast, the present invention takes advantage of the computing power in the printer and is designed to allow free communications between the host computer and the printer. The present invention views the host computer and the printer as two parts of the same "system" which can cooperate with each other to more efficiently print documents. In the above example where two character font sets are required to print a document, the host computer of the present invention is aware that the printer could retain the first font set and thus will retain the first font set in the printer memory. Furthermore, the prior art host computer typically looks only at the current page being processed and does not look ahead to determine if the first font set may be required in the future and should be retained within the printer memory. As a result, the prior art host computer must repeatedly download the first font set if it is required for printing several pages (and may delete the second font set in the process). It should be noted that some prior art systems do have crude look-ahead capability, but it is very limited and does not efficiently utilize memory. The prior art host is not always sure how much printer memory is available, and therefore must be very conservative in its use of printer memory. In contrast, the present system will look ahead at the printing task to determine whether the first font set, or any other resource, should be retained in the printer memory and to determine when the first font set is no longer needed and can be released or deleted from the printer memory. Furthermore, the system of the present invention constructs subsets of character fonts when only a portion of a font set is required, which maximizes the use of available resources. Thus, the present invention takes a resource-oriented approach to printing.

While the description provides details of operation with a laser printer, the inventive system and method is applicable to any marking technology such as laser, thermal, impact, sublimation, ink-jet, or the like.

a resource is anything within the computer-printer system that occupies memory or is required to print a document. The document will be completely described using resources. The term resources will be explained in greater detail below. According to the principles of the present invention, the goal is to print the document quickly and allow the host computer to return to the application program in a minimum amount of time. This is accomplished by allowing open communication between the host computer and the printer so that the requirements of each part of the system and the available resources to accomplish the task are readily known by other parts of the system. The entire printing process is faster than prior art computer-printer systems, in part, because the computing power and available memory of the host computer and the printer are called into play.

The present invention may be used with a computer-printer system that has only one-way communication capability and uses a status line from the printer to the host computer to indicate that the printer is busy. Other computers or printers may have bi-directional communication, but cannot support full bi-directional communication at a data rate required by the present invention or hamper full bi-directional communication because they cannot switch directions quickly enough. The present invention will attempt to establish bi-directional communication, but will resort to one way communication if either the computer or printer cannot support bi-directional communication because the latency time is so long that it cannot efficiently support full bi-directional communication. However, many computer-printer systems have full bi-directional communication between the host computer and the printer. If a computer-printer system has bi-directional capability, the present invention has enhanced error recovery capability and the ability to shift some of the functions back and forth between the printer and the host computer depending on the particular printing task. This "load balancing" allows even greater increases in printing speed by allowing the print task to be handled by the portion of the computer-printer system that can most efficiently perform the task.

As previously discussed, a resource is virtually anything that is required to print a document. This may include character font sets, glyph sets, point tables, brushes, and user defined graphic images as well as the data that describes the page itself. A "font set" is a set of ASCII characters, usually stored as bit-map, that define a particular character typeface such as Times-Roman, Helvetica, Courier or the like. Some printers have font sets stored in read-only memory (ROM) integrated circuits within the printer, while other computer-printer systems use "soft fonts" which are stored as bit map data files within the host computer and downloaded to the printer random access memory (RAM) when needed. Soft fonts allow greater flexibility in printing since the fonts generally reside on disk in the host computer and thus do not permanently occupy memory space within the printer. Still other computer-printer systems use font scaling technology, such as TrueType fonts, where the fonts are not stored as a bit map data file. Instead, the fonts are described by a set of equations which define the lines and curves of characters for each font type. The host computer or printer use these equations to construct a particular font character of any point size. The advantage of font scaling technology is that a single set of equations may be used to describe a font type for all point sizes whereas fonts that are stored as bit-maps can only be used for a single point size. For example, Times-Roman 4, Times-Roman 6, Times-Roman 8, and Times-Roman 10 are considered four separate fonts and each requires a separate bit-map data file to describe the particular font. In contrast, font scaling technology has a single set of equations that describe Times-Roman characters of all point sizes. The host computer or printer applies the equations and scales the equations for the selected point size so that multiple sets of bit-map data files are not necessary. The present invention works with either ROM stored fonts, soft fonts, or the font scaling technology.

A "glyph set" is similar to a soft font in that it comprises predefined characters stored in the host computer. However, it is different from a font set in that the predefined characters are not necessarily a complete character font set and may contain user defined characters, graphic symbols, or combinations of different typefaces from various character font sets. For example, a glyph set may be an equation containing numbers and mathematical symbols from several different font sets, as well as some user defined graphic symbols. A particular glyph set may be large enough to contain a complete character set or may be as small as a single character. Another example of a glyph set is a form, such as a tax return or a data entry form, that may be used within a document. The present invention may create the form and store it as a glyph set. If the form is used again in a document, the entire form is available as a glyph set. It should be noted that a glyph set is not the only way to implement a form. For example, another way to implement forms is to use a render primitive list (RPL) to represent the form. The RPL may use glyph sets for pieces of the form, but the RPL puts it all together.

Some prior art systems use glyph sets in a limited manner. Prior art host computers may assemble a subset of a character font to download to the printer. If a new character is needed, the prior art host computer can incrementally download only the needed new character and append it to the already downloaded glyph set. However, prior art systems do not actively manage the glyph set resource. Prior art systems generally clear glyph sets at the start of a new page without regard for future need for the glyph set. This forces the prior art host computer to construct new glyph sets if they are needed on the new page. The newly constructed glyph set may not be the same as the previous glyph set, and the periodic reconstruction and downloading of glyph sets consumes extra time in the printing process. In addition, prior art systems require a great deal of data to accompany the glyph sets to indicate which characters are present in the glyph set.

In contrast, the present invention constructs a glyph set from the available resources and actively manages the glyph set as a single resource. The term "glyph set", as used in the present invention, refers to a resource that comprises portions of other resources such as fonts. For simplicity, glyph sets will be referred to as resources. The present invention assembles the glyph set until it reaches a predetermined size, but may not immediately transfer the glyph set to the printer. The assembled glyph set is treated as a unit that is transferred to the printer when needed, and is deleted from the printer as a unit when it is no longer needed. The glyph set is actively managed based on the future need for the glyph set and the available space in the printer resource store rather than the prior art approach of clearing the printer memory at the start of a new page. The glyph set of the present invention also contains a header as a "table of contents" indicating which characters are in the glyph set, but the header is much smaller in size than prior art headers because the glyph set does not change once it is constructed.

A "point table" is a table of coordinates points used to define a graphic object. For example, a graphic object such as a rectangle may be defined by the coordinates of the four corners. Similarly, a cubic Bézier curve is defined by four control points. The point table stores the coordinates of the control points. To print a smoother curve on the laser printer when a Bézier curve is rendered, the curve rendering process is often performed using a high resolution that exceeds the actual resolution of the printer. The lines that are calculated to render the curve may be shared when the object is actually printed on the printer thus creating a smoother looking image. If the higher resolution calculations are performed, the point table may contain the coordinates of all the line segments used to render the Bézier curve. The point tables may also be created by the user in an application program by using a mouse or other pointing device to draw, entering coordinates, using a digitizing tablet or the like.

A "brush" is a graphic pattern typically used to fill the interior of a graphic object such as a rectangle or a circle. A brush is the smallest repeating pattern that will be repeated to fill in the entire interior of the graphic object. For example, when an object such a circle is created, the draw primitive will instruct the printer to create the circle and fill the interior with a particular graphic pattern. A cross-hatch pattern, for example, may comprise a series of small "x" shapes that can be repeated to fill in the entire object. The system of the present invention stores commonly used brushes within the printer and creates additional various brushes with the host computer.

The data that describes the printed page is also considered a resource. The host computer contains a description of the page that may have been created by an applications program such as a word processor, a spread sheet, a data base or the like. The present invention translates the page description into a set of draw primitives and interrelates the draw primitives with the other resources required to print the document. The details of the translation process will be described below.

Figure 2:
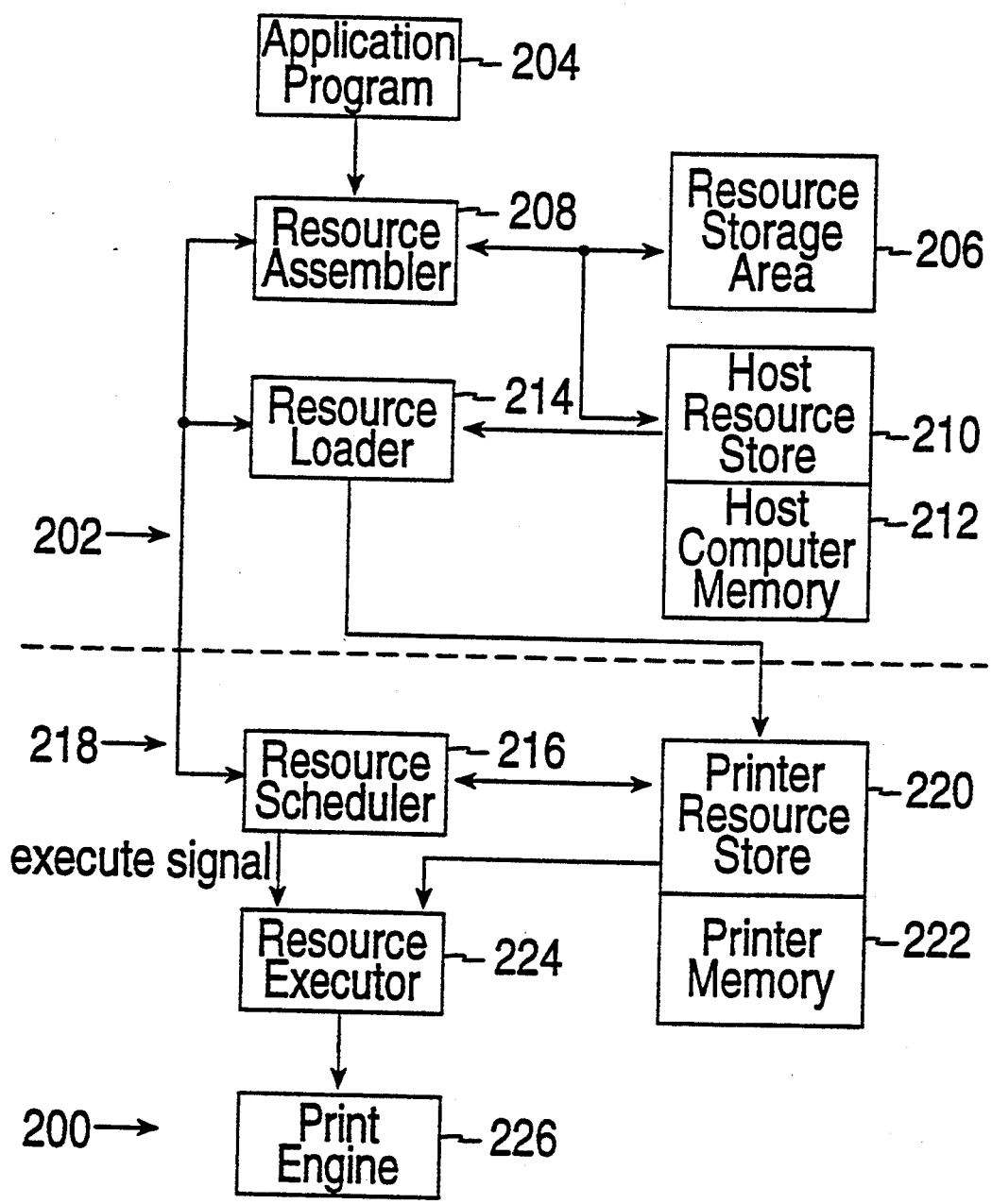
FIG. 2 is a functional block diagram of the computer-printer system of the present invention.

As shown in the functional block diagram of FIG. 2 for purposes of illustration, the present invention is embodied in a computer-printer system 200. As with the prior art, a host computer 202, executes an application program 204 containing a document that is to be printed. As previously described, resources are stored in various areas of the host computer 202, such as a host computer memory 212 which may include a hard disk memory. The various storage areas will generically be referred to as the resource storage area 206. The host computer 202 contains virtually all resources available for printing documents. Some ROM stored fonts and commonly used resources may be stored in the printer throughout the printing task. A resource assembler 208 examines the document to determine which resources are required to print the document. As the resource assembler 208 examines the document, it selects the resources which will be required to print the document and translates the document into a set of draw primitives that describes the printed pages. The selected resources and draw primitives are stored within a host resource store 210. The host resource store 210 may be part of the host computer memory 212 or any other suitable storage location. The resource assembler 208 defines dependencies between a document and a subset of the resources which are required to print the particular document. The resource assembler 208 communicates the dependency information to a printer 218 which is attached to the host computer 202. The resource assembler 208 may also receive information from the printer 218 as to the most efficient sequence for printing the document as well as status information as to what resources are currently in the printer 218.

The printer 218 contains a printer resource store 220 which has the capacity to store a limited number of resources downloaded from the host resource store 210. The printer resource store 220 may be part of a printer memory 222 or any other suitable storage location. A resource loader 214, shown in FIG. 2 as being a part of the host computer 202, uses the dependencies created by the resource assembler 208 to determine the order in which resources, including draw primitives, will be transferred to the printer resource store 220. The resource loader 214 also determines the order in which resources can or must be released from the printer resource store 220 to make room for new resources. The draw primitives transferred by the resource loader 214 instruct the printer 218 to utilize specified resources to create a graphic symbol, draw a graphic object, print an alphanumeric character, or the like.

A resource scheduler 216, shown located within the printer 218, may alternatively be located within the host computer 202. The resource scheduler 216 controls the timing of printer operation and the actual timing of resource transfer. The resource scheduler 216 also controls the timing of the deletion of resources from the printer resource store 220 and of requests to transfer particular resources from the host resource store 210. When all of the resources necessary for a particular page of the document are in the printer resource store 220, the resource scheduler 216 generates an execute signal to indicate that the subset of required resources are available for printing the present page. A resource executor 224, upon receiving the execute signal from the resource scheduler 216, follows the commands of the draw primitives and uses the resources from the printer resource store 220, to create a bit-map data file of the document page currently being processed. The resource executor 224 transfers the bit-map data file to a print engine 226 which in turn causes the document page to be printed.

It should be noted that the physical location of many of the above-described resource blocks is not critical to the operation of the present invention. If in a computer-printer system 200 the printer 218 is a laser printer with a great deal of computing power, all of the resource blocks described above could be located within the printer and still utilize the inventive aspects described herein. For example, the resource scheduler 216 may be located within the host computer 202 or the printer 218, as noted above. Similarly, the printer resource store 220 may be alternatively located within the host computer 202. If the host computer 202 is operating in an environment such as Windows TM, the printer resource store 220 may be part of the despooler function that operates in the background while the application program operates in the foreground. The principles of the present invention still apply because the printer resource store 220 is still limited in size and operates in the same manner as it would if the printer resource store was located within the printer 218. The background operation is transparent from the perspective of the application program. Thus, the actual location of the printer resource store 220 is not critical. As a practical matter, the host computer 202 will generally have more computing power than the printer 218. Therefore, the resource blocks described above are allocated to either the host computer 202 or the printer 218 depending on the relative computing power of each, and the availability of a bi-directional communications channel between the host computer and the printer.

The host computer 202 stores the resources in various locations within the host computer 202 or in the printer 218 (in the case of ROM stored character fonts). For example, glyph sets are assembled by the resource assembler 208 and stored as bit-map data files within the host resource store 210. The computer-printer system 200 also stores point tables representing various graphic objects within the host resource store 210. The point tables are loaded into the host resource store 210 by the resource assembler 208, which may also convert the point table to a data format used by the present invention. In other cases, the data describing a graphic object may be stored by an applications program in a format other than a point table. The resource assembler 208 creates a point table in the appropriate data format and stores the created point table in the host resource store 210. In contrast, soft font sets are typically stored as data files on a hard disk (not shown). If the resource assembler 208 determines that a particular soft font character or brush is required, the resource is loaded into the host resource store 210.

In both the prior art and the present inventive computer-printer system 200, the application program 204 generates a document description that may reside with the host computer memory 212 or any other suitable storage location such as a hard disk (not shown). The application program stores the document using a Page Description Language (PDL), which may vary from one application program to another. In prior art systems, an assembler within the host computer converts the PDL into a set of draw primitives, which may generically be called Render Primitives (RPs). The RPs may contain alphanumeric characters, graphic objects, or combinations of the two. In some prior art systems, the host computer translates the RPs into a bit-map data file of the document page, in a process called rendering the primitives list. It is the bit-map data that prior art host computers transfer to the printer. Other host computers of the prior art convert the RPs into an intermediate level language such as PostScript TM or PCL TM.

Some systems of the prior art actually have a portion of the system that functions in a manner similar to resource assemblers. The prior art assembler is within the host computer and converts the PDL into RPLs. The parser, described above, acts as a second resource assembler in the prior art and receives the RPLs and constructs the intermediate data structures that will be required to translate the intermediate level language into a corresponding bit-map. The parser is designed to process code and not specifically designed to produce a printed page.

In contrast, the computer-printer system 200 of the present invention uses only a single resource assembler 208, which is typically located within the host computer 202. The resource assembler 208 is only concerned with producing a printed page, and the code created by the resource assembler is designed to efficiently print documents. The resource assembler 208 examines the document and converts the PDL to RPLs while determining which resources are required to print the document. The resource assembler 208 gathers the selected resources and places them into the host resource store 210 along with the associated RPLs. The present invention need not place the resources and RPLs in the host resource store in a particular format that associates the resources with specific RPLs. In fact, the actual data structure and format is not important for the use of the present invention. Many different formats well known to those of ordinary skill in the art are acceptable for the proper operation of the present invention. A list stating the dependencies and location of resources and RPLs is all that is necessary. This list may take the form of a series of pointers, indicating locations where the resources and associated RPLs are stored. The list may even be implied by a predetermined sequence of execution of RPLs as will be discussed below.

Figure 3A:
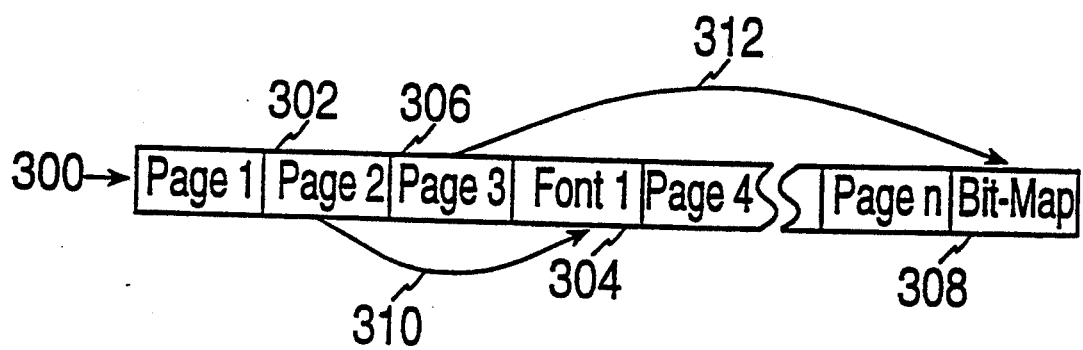
FIG. 3A illustrates a manner in which an unbounded document may be represented.

When resources are stored within the host resource store 210, they are considered unbounded since there is no constraint on the size of the data file containing resources and RPLs nor are there constraints on the sequence in which the resources and RPLs are stored. For example, a document may be created by the user and subsequently edited to include a graphics chart near the beginning of the document. The applications program will not recreate the entire document file to insert the graphics chart. Rather, the applications program will place the graphics chart at the end of the document file and insert a pointer in the document at the point where the graphics chart should be inserted. The pointer points to the location of the graphics chart. This common technique uses backwards pointing, that is the insertion point in the document points backward to a later position in the document file where the graphics chart is stored. This technique is shown graphically in FIG. 3A where a document 300 has N pages. Page two of the document, indicated by the reference numeral 302, requires Font 1 304, while page three 306 of the document 300 requires the graphics chart, which is represented by a bit-map 308. Note that Font 1 304 and the bit-map 308 are stored after the locations on page two 302 and page three 306, respectively, in the document 300 where the font and bit-map are required. The data pointers 310 and 312 point to the locations 304 and 308, respectively, where the resources are required. Since the document is unbounded, the computer has access to the entire document and can utilize pointers in the manner described above.

Figure 3B:
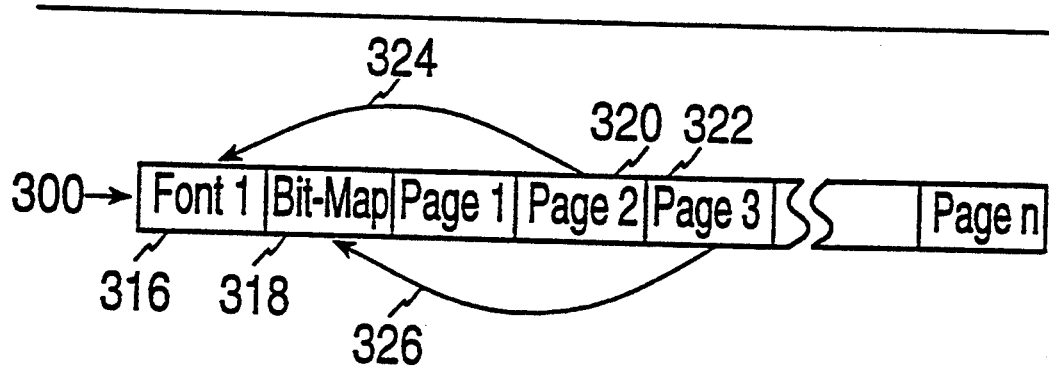
FIG. 3B illustrates the manner in which the unbounded document of FIG. 3A may be represented in a bounded fashion.
Figure 3C:
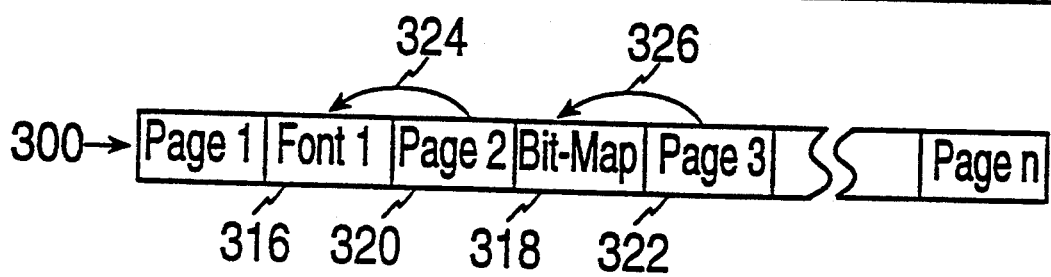
FIG. 3C illustrates an alternative configuration of the bounded document of FIG. 3B.

However, when printing the document, the printer will not have access to the entire file at once. Therefore, the document is considered to be bounded by both the size constraints of the printer resource store 220 and the sequence in which the document is stored. The required resources must be present in the printer before they are actually needed or the printer will be delayed or may not be able to print a particular page at all. The document must be assembled in a bounded fashion as indicated in FIG. 3B where the same document 300 is represented as a bounded document. The required font 316 and the bit-map 318 appear in the document 300 before they are actually required for page two 320 and page three 322. The pointers 324 and 326 point to the locations 316 and 318, respectively, where the resources are stored. Thus, the pointers 324 and 326 are forward pointing to a location in the document 300 where the resources are stored. In this manner, the resources are always present before they are required for printing the document. Note that it is not necessary that the resources be located at the beginning of the document. It is only necessary that the resources be located before the place in the document where the particular resource is required. For example, the document 300 is alternatively shown in bounded fashion in FIG. 3C where Font 1 316 is located just in front of the location 320 where the resource is needed. The pointer 324 indicates the location of the required resource. Similarly, the bit-map 318 is located just in front of the location 322 where it is required, and the pointer 326 indicates the location where the resource is required.

It should be noted that, while the host computer 202 generally has more memory than the printer 218, there is a limit to the amount of host computer memory 212 that can be allocated to the host resource store 210. Therefore, the host resource store 210 does not contain all possible resources stored on the computer. Rather, the host resource store contains only the resources required to print the particular document as well as the RPLs describing the document. When a particular portion of the document has been printed, the resource required for the particular portion of the document are deleted from the host resource store 210. Some resources may be used only once in a document and may be deleted immediately upon completion of printing that portion of the document. Other resources, such as glyph sets, that may be used frequently are stored within the host resource store 210 until no longer needed for a document.

Because the host computer 202 typically has more memory than the printer 218, the host computer can allocate more of the host computer memory 212 to use for a host resource store 210. The printer 218, having less memory, has a correspondingly smaller printer resource store 220. The printer resource store 220 is not sufficiently large to hold the entire set of resources that the host resource store 210 contains. Thus, resources must be downloaded from the host resource store 210 to the printer resource store 220 when needed by the printer 218. The printer 218 must make efficient use of the resources within the printer resource store 220, and delete resources that are no longer needed or can be quickly reloaded from the host resource store 210. Thus, the host resource store 210 is loaded only a single time with the resources required to print the document, while resources may be downloaded and released from the printer resource store 220 many times during the course of printing the document. In order to determine the most efficient use of resources, the computer-printer system 200 of the present invention examines the entire document to determine how to allocate resources in the most efficient manner.

Referring again to FIG. 2, the detailed operation of the computer-printer system 200 is provided. The resource assembler 208 converts the PDL into a set of RPLs and determines which resources are required for the present printing task. As the print task begins the resource assembler 208 begins to look at the first band (if the printer 218 is operating in the banding mode) or page (if the printer 218 is operating in the page mode) of data describing the surface to be printed. For purposes of this application, the unit size of the document being processed, whether a band or a page, will be referred to as a data block. The resource assembler 208 selects resources from the resource storage area 206 which will be required to print the document. The resource assembler 208 also determines the dependencies of these resources to particular data blocks. For example, the resource assembler 208 may determine that a particular font type is required for a formula on the first page and that another font type is required for the remainder of the page. In addition, a graph may be printed on the page which will require certain grahics resources such as a point table and a brush.

The resource assembler 208 creates a list that explicitly states the dependencies and the data block for which these resources are required. It should be noted that the list need not be in the form of a list. As stated above, the list may be in the form of pointers to memory locations, or may even be implicitly defined by the sequence in which RPLs are created by the resource assembler 208. For example, if a programmer writes a program that creates and immediately executes the first RPL, there is no expressed list that is created and stored in the host resource store 210. However, there is an implied list that is specified by the order in which the tasks are created within the RPL. What is important for efficient operation of the present invention is that the resource assembler 208 determines the dependencies and makes other resource blocks aware of the dependencies.

There are two different types of dependencies specified by the resource assembler 208. The first type of dependencies are operand dependencies which relate the required resources to a particular data block as described above. The second type of dependencies are execution dependencies, which specify the sequence in which RPLs are processed. Some prior art systems may not satisfy the execution dependencies when they print a document. For example, some prior art systems separate text from graphics and process the two independently. The printed page, therefore, may not be what the user sees on the display screen. Thus, prior art systems do not always result in "what you see is what you get" (WYSIWYG). In contrast, the computer-printer system 200 always satisfies execution dependencies, even if they are implied in the sequence of RPLs as described above because the system processes the entire data block rather than breaking a data block into text and graphics portions.

Some execution dependencies may be specified by the printer 218 if there is bi-directional communication between the printer and the host computer 202. As will be explained in greater detail below, the printer may specify the order in which pages or bands of data should be processed in order to maximize efficiency of the printing process. If execution dependencies are specified by the printer 218, the resource assembler 208 will comply with those dependencies. The resource assembler 208 may also generate its own execution dependencies if there is a specific drawing order that must be maintained within a data block. For example, the printer 218 may instruct the resource assembler 208 to process page two of a document first, and to process page two from the bottom to top. This is an execution dependency that is specified by the printer 218. However, if there are overlapping graphic objects on page two, the drawing order of those objects must be specified so that the printed page will appear to have the objects overlap in the intended manner. The resource assembler 208 determines the execution dependencies that specify the drawing order. Thus, the resource assembler 208 creates a list that states both operand dependencies and all execution dependencies (whether specified by the resource assembler 208 or the printer 218).

As discussed above, the list for some dependencies may be implicit in the sequence of draw primitives within a band or page. For example, the computer-printer system 200 could always execute the first RPL first, thus creating an execution dependency that does not have to be explicitly stated. For maximum efficiency, particularly with sophisticated printers and bi-directional communication, the presently preferred embodiment of the computer-printer system 200 does not use implied dependencies since they can unnecessarily limit the execution to a less efficient sequence of tasks. The above examples of using implicit dependencies are given only to show that the broad principles of the present invention may be used to improve the overall efficiency of the printing process without requiring the use of all inventive aspects of the computer-printer system 200. In the presently preferred embodiment, the resource assembler 208 explicitly communicates dependencies to other components of the system, including the resource loader 214, the resource scheduler 216, and the printer 218.

If the computer-printer system 200 has bi-directional communications capability, the printer 218 can send information to the resource assembler 208 as to the current status of the printer resource store 220. Such status information includes which resources may already be present in the printer resource store 220 and how much space is available in the printer resource store. In addition, the printer will instruct the resource assembler 208 as to the most efficient sequence for printing the document. This is an important process in large sophisticated laser printers that have duplexing capability and can print from multiple paper trays. In such printers, there can be as many as ten sheets of paper moving through the print engine simultaneously. Pages that are printed on both sides of a sheet of paper (duplex mode) are processed from top to bottom on one side of the paper and from bottom to top on the other side of the paper. Different page sizes require different lengths of time in the print engine. Modes such as the landscape mode may require more print engine processing time than other modes. Pages may actually pass each other inside the print engine of a sophisticated laser printer. As a result, the most efficient sequence for processing the pages may not be the numerical order of the pages (i.e., page 1, 2, 3, ... ). The computer-printer system 200 of the present invention allows the printer 218 to determine that most efficient sequence for printing the document and to communicate that information to the resource assembler 208. In systems that only have one-way communications, the printer 218 cannot communicate status information or print sequence instructions. However, the resource assembler 208 still communicates the explicit dependencies to the printer 218 so that the printer 218 will know when it may delete resources from the printer resource store 220. If only one-way communication is available, the resource assembler 208 still knows the status of the printer resource store 220 because the host computer 202 manages the printer memory 222 in the one-way mode. Thus, the resource assembler 208 knows which resources are already in the printer resource store 220 at the start of a printing task.

As previously discussed, the resource executor 224 typically converts the RPLs to bit-map data to be printed by the print engine 226. Once, the print engine has started, it cannot stop printing the page or an error will occur. Therefore, once the print engine has been committed, the RPLs must be converted to bit-map data in real-time or have been previously converted to bit-map data. Of course, certain printers, such as dot matrix printers and ink-jet printers, can stop in the middle of a page without creating an error. The resource assembler 208, knowing the current status of the printer resource store 220 and the overall processing power of the printer 218, examines each data block to determine if the printer 218 can convert the RPL for the data block into a bit-map in real-time as the print engine 226 is running. If the printer cannot convert the RPL for the data block in real-time, then the resource assembler 208 will instruct the host computer 202 to process the RPL into a bit-map and transfer the bit-map to the printer 218. Alternatively, if the printer memory 222 is sufficient to store a bit-map data file for the entire page, the resource assembler 208 may instruct the printer 218 to convert the RPL into a bit-map data file and store the bit-map within the printer memory 222 until the print engine 226 is committed. The decision as to which part of the computer-printer system 200 will convert the RPL into a bit-map depends on the relative complexity of the conversion task and the relative processing power of the processors within each of the parts of the system. In the presently preferred embodiment, the resource assembler 208 consider three factors in determining which portion of the computer-printer system 200 will process the data. Those factors are:

1. The length of time required for the host computer 202 to process the RPL into bit-map data;

2. The length of time required for the printer 218 to process the RPL into bit-map data; and 3. The length of time required on the communication channel to transfer the RPL or the bit-map data.

In other words, the resource assembler 208 calculates the time required for the host computer 202 to process the RPL for a particular data block into a bit-map data file plus the time required for the communication channel to transfer the bit-map data file to the printer 218 and compares it to the time required for the communication channel to transfer the RPL to the printer plus the time required for the printer to process the RPL into a bit-map data file. The selection of host computer 202 or printer 218 to process a data block is determined by cost metrics, which will be discussed in detail below.

The computer-printer system 200 also performs load balancing by shifting the data processing back and forth between the host computer 202 and the printer 218. The resource assembler 208 will select the host computer 202 or the printer 218 to process the data block depending on which part of the system can process the data block most efficiently. For example, if a particular task requires the drawing of a large number of lines on the page, and the processor of the host computer is twice as fast as the processor of the printer, the host computer 202 will probably be instructed to process the data. On the other hand, if the conversion is relatively simple, and the printer 218 has the memory capacity to store the bit-map, the processor of the printer may be instructed to process the data leaving the host computer processor free to process the next data block. It should be noted that this calculation is a dynamic process that may vary from one data block to another. The printer 218 may process one data block and the host computer 202 may process the next three data blocks. The overall goal is to produce the document in the most efficient manner. The computer-printer system 200 of the present invention allows this by using the potential computing power of both the host computer 202 and the printer 218.

The load balancing is based on a variety of parameters such as the relative computing power of the host computer 202 and the printer 218, the speed of the data communications channel, the relative sizes of the host resource store 210 and the printer resource store 220, the complexity of the printing task, and the tasks currently being performed by the host computer 202 and the printer 218. As previously stated, load balancing is a dynamic process in which the resource assembler 208 may assign some pages of a document to the host computer 202 and other pages to the printer 218 for processing based on the parameters discussed above.

The load balancing may even shift data processing responsibilities between the host computer 202 and the printer 218 within a single page. An example of different portions of the computer-printer system 200 processing the same page may occur when a particular page of a document contains two overlapping graphics objects, such as circles. The resource assembler 208 may send the PDL description of the first circle to the printer 218 because the printer is not currently printing. Therefore, the printer 218 will have the time to translate the PDL for the first circle. The host computer 202 may translate the PDL for the second circle because the host computer 202 has more computing power than the printer 218, and the printer 218 is already busy translating the first circle. Thus, the resource assembler 208 has used load balancing to split data processing responsibilities between the host computer 202 and the printer 218.

As previously stated, a resource that is required for a particular data block of the document creates a dependency within the computer-printer system 200 for a particular resource for that particular data block. The dependencies may vary from one data block to another. The resource assembler 208 explicitly states the dependencies so that the printer 218 knows which resources are required for a particular data block. Thus, the printer has a sort of "menu" of resources relating the required resources with each of the data blocks. With bi-directional communication, the printer 218 can manage its own memory because the explicit dependencies between data blocks and resources have been provided. The printer 218 uses the menu of explicit dependencies to request resources from the host resource store 210 in a manner that maximizes efficiency of the printer resource store 220. For example, the explicit dependencies may state that one data block requires a particular font set and a particular glyph set, while the next data block requires the same font set but a different glyph set. The printer 218 may be able to hold all three resources (the font set and two glyph sets) in the printer resource store 220 at one time. Therefore, the printer 218 will request all three resources.

A more difficult aspect of resource management is deciding which resources should be deleted from the printer resource store 220. If printing a particular data block requires a resource so large in size that other resources must be deleted from the printer resource store 220, the printer 218 can decide which resource or resources to delete from the printer resource store 220 and when to request resources back from the host computer 202 for future data blocks. Furthermore, if error recovery is required, the printer 218 knows which resources are required to recover the lost pages and can request the necessary resources from the host computer 202 if necessary resources have already been deleted from the printer resource store 220.

The previous discussion is applicable when there is bi-directional communication between the host computer 202 and the printer 218. If there is only one-way communication available, the printer memory 222 is managed by the host computer 202. In that case, the host computer determines the sequence in which resources will be loaded into or deleted from the printer resource store 220 and when to load and delete the resources. Even though the printer 218 cannot manage its own memory with one-way communication, the present invention still represents an improvement in performance over the prior art because of the elimination of the parser and the addition of portions of the computer-printer system 200 such as the resource assembler 208 and the host and printer resource stores 210 and 220. In the computer-printer system 200 of the present invention, the resources may be loaded and released from the printer resource store 220 multiple times in the course of printing the entire document. The job of determining which resources should be in the printer resource store 220 is performed by the resource loader 214 and will be described in detail below.

The resource assembler 208 examines the document several data blocks ahead of the resource loader 214 to generate resources for future data blocks. This allows the resource loader 214 to look ahead and determine the most efficient allocation of resources. Some resources may be used in many data blocks throughout the document and thus have dependencies throughout the document. It may be more efficient to retain these resources within the printer 218 throughout the printing process, depending on the available space within the printer resource store 220. A second resource, for example, may be needed only once in the middle of a document. In that case, the second resource may not be loaded until later when some other resource is no longer needed by the printer 218 and more memory is available within the printer resource store 220. After the second resource is used once, it may be deleted from the printer resource store 220 to make room for other resources.

The determination of how far to look ahead is a dynamic process. For example, at the start of a document, the goal is to get the print engine 226 started. Therefore, the resource assembler 208 will have limited look ahead operation in order to get resources transferred to the printer 218 as soon as possible. However, while the printer 218 is processing the first data blocks, the resource assembler can look ahead to future data blocks and select resources for the host resource store 210 as well as construct RPLs for future pages. Ideally, the resource assembler 208 can look ahead to examine the entire document before any printing occurs. However, the desire to start the print engine 226 limits the initial look ahead capability. There is a practical limit to the amount of look ahead capability a system should have. The desire to minimize the use of host computer memory 212 so that other applications programs may run also limits the ability of the resource assembler 208 to look ahead. The goal is to keep the print engine 226 moving as efficiently as possible. The actual number of pages that the resource assembler 208 looks ahead depends on such factors as the total length of the document, the current page of the document being processed by the print engine 226, and the complexity of the document. The look-ahead capability of the resource assembler 208 enhances the ability of the resource loader 214 to control the flow of resources to the printer resource store 220.

As an example of the operation of the resource assembler 208, consider that a particular page of text requires portions of five different font sets and a point table (to draw a Bézier curve) to print the page. The resource assembler 208 examines the page and creates a list of explicit dependencies. The resource assembler 208 communicates the dependencies to other portions of the computer-printer system 200 as described above. At the same time, the resource assembler 208 also begins to assemble the host resource store 210 which will contain the required resources and the RPLs describing the page. Note that in the bi-directional mode, the resource assembler 208 will receive information from the printer 218 as to the sequence in which the data blocks will be processed. For simplicity, assume that the resource assembler 208 will process the data blocks for the page from top to bottom. There will be a single RPL if the printer 218 is operating in the page mode, while there will be a different RPL for each band if the printer is in the banding mode. The RPL will describe the data block (page or band) in a format that will tell the printer 218 to print a particular sequence of characters at a particular point on the page. The computer-printer system 200 uses this information to construct a description of the character sequence and store the description in the host resource store 210. The term "construct a description" may range from loading a bit-map of the character sequence from a storage location within the host computer 202 to using font scaling technology to construct the bit-map of the character sequence from a set of equations. The resource assembler 208 may store an entire font if so many characters from that font are required that it is more efficient to transfer the entire font set. On the other hand, if only a limited number of characters are required, the resource assembler 208 may open a glyph set to store only the required characters.

In the present example, the first font set may be transferred in its entirety. The only required characters from the second font set may be numbers and mathematical symbols for an equation. The resource assembler will open a glyph set to store the characters for the equation. The glyph set may remain open because the next portion of the page requires a limited number of characters in italics (font number three). It should be noted that the size of a glyph set is dynamically variable. For example, at the beginning of the printing operation, the goal is to get the print engine 226 to work as quickly as possible. To that end, the resource assembler 208 may use small glyph sets for the first data blocks of the document so the glyph sets may be transferred to the printer resource store 220 as soon as possible. This gives the print engine 226 something to work on while the resource assembler 208 assembles resources for subsequent data blocks. The size of subsequent glyph sets is generally determined by parameters such as the size of the printer resource store 220 and the rate of data transfer between the host computer 202 and the printer 218. The resource assembler 208 will keep the glyph set open until it reaches a predetermined size.

As previously described, glyph sets may contain characters from different font sets. Conversely, characters from the same font set may be stored in different glyph sets because of the dependencies. For example, some of the characters used in the mathematical formula described above may be used in a second equation printed in a subsequent data block. The second equation may also use additional characters from the second font set as well as characters from fourth and fifth font sets. The resource assembler 208 may construct a second glyph set that contains only the additional characters required for the second equation. When the resource executor 224 processes the RPLs and resources into a bit-map data file, it will use the characters from both glyph sets to construct a bit map for the second equation. The RPL for placing a glyph set is in a format that identifies which glyph set and which character is being placed at a particular position on the printed page. The RPL for the second equation of the example may have the following sequence:

Glyph set 1, character 1;
Glyph set 1, character 2;
Glyph set 1, character 3;
Glyph set 1, character 12;
Glyph set 2, character 1;
Glyph set 2, character 2;
Glyph set 1, character 17;
Glyph set 2, character 3;
Glyph set 2, character 4;
Glyph set 2, character 4;
Glyph set 2, character 5;
Glyph set 2, character 6; and
Glyph set 2, character 7.

Note that the use of both glyph sets in a single RPL necessitates having both glyph sets in the printer resource store 220 at the same time. If the first glyph set has been deleted from the printer resource store 220, the resource loader 214 determines that the first glyph set must be reloaded from the host resource store 210.

The resource scheduler 216 controls the timing of the request so that the printer resource store 220 does not overflow and so that the resources are available in the printer resource store in a timely manner. Prior art systems download entire fonts and do not attempt to manage the printer memory. This can result in memory overflows where the print task cannot be completed. Even systems that can perform incremental downloading, as described above, do not attempt to manage the printer memory except to periodically clear the downloaded fonts. In contrast, the computer-printer system 200 of the present invention saves time and printer memory by assembling characters into glyph sets because only the required characters are transferred to the printer resource store 220, and the glyph set resource is actively managed as described above. Thus, the overall efficiency of the printing process is enhanced.

To summarize the operation of the resource assembler 208, the resource assembler determines the resource dependencies, communicates that information to other portions of the computer-printer system 200 and processes the document description in the most efficient manner. The resource assembler 208 also creates RPLs describing the data blocks and stores the RPLs and resources within the host resource store 210.

The resource loader 214 is responsible for determining the sequence in which resources will be loaded into and released from the printer resource store 220. The resource loader 214 always has access to the system dependencies determined by the resource assembler 208 so that the most efficient sequence of loading and reloading resources can be determined. The resource loader 214 may be located within the host computer 202 or within the printer 218 depending on the communication capability of the computer-printer system 200. If there is only one way communication from the host computer 202 to the printer 218, the resource loader 214 always resides in the host computer 202. Thus, the printer memory 222 is managed by the host computer 202. However, if there is bi-directional communication capability, the resource loader 214 may reside in the printer 218 to allow the printer to manage its own memory. The resource loader 214 controls the transfer of both the RPLs and the resources to the printer 218.

As noted above, the host resource store 210 is large enough in size that resources assembled by the resource assembler 208 are loaded into the host resource store only a single time. The host resource store 210 is not concerned with the size of the resources or the constraints imposed by the size of the printer resource store 220. On the other hand, the printer resource store 220 is limited in size, and the resources are constrained by the size limitation. To effectively manage the printer resource store 220, the resource loader 214 looks at the size of each resource already in the printer resource store 220 and at the resource dependencies (previously determined by the resource assembler 208) and determines the order in which the resources are to be loaded into the printer and released from the printer so that the printer resource store 220 does not run out of space. Thus, the resource loader 214 may load and release a particular resource many times during the course of a printing task.

It should be noted that the resource loader 214 may release a particular resource when it is no longer needed. The printer 218 may not immediately delete the particular resource from the printer resource store 220 because the resource may still be needed within the printer 218. Since the host computer 202 and the printer 218 operate asynchronously, the release of a resource by the resource loader 214 may not immediately cause the deletion of the resource from the printer resource store 220. Thus, the terms "releasing" and "deleting" a resource are not synonymous. A resource is released when the resource loader 214 determines that a resource should be eliminated from the printer resource store 220. From the perspective of the resource loader 214, the resource is no longer present in the printer 218. The resource loader 214 will then specify the next resource to load or release. A resource is deleted when the printer 218 no longer requires the resource within the printer and actually deletes the resource from the printer resource store 220. The resource loader 214 is only interested in the size of each resource and whether it makes sense, from an efficiency perspective, for a particular resource to be present in the printer resource store 220. The resource loader 214 keeps track of the size of the printer resource store 220 and the available space therein, the current state of the printer resource store 220 (i.e., which resources are present in the printer resource store), and determines which resources to retain or release. The resource loader 214 looks at the explicit dependencies for both current RPLs and future RPLs. Note that the resource loader 214 is only interested in the order in which resources should be loaded and released; it is not concerned with the actual timing of resource changes. The timing of changes to the printer resource store 220 is controlled by the resource scheduler 216.

As stated above, the explicitly stated dependencies makes it easier for the resource loader 214 to determine the sequence of loading resources into the printer resource store 220. The more difficult task is to determine when to release resources from the printer resource store 220 to make room for new resources. It is obvious that a resource that will never be used again can be deleted without concern. However, if the resources will be used again in the future, the resource loader 214 must decide which resources to release to make room for new resources. In many caching systems of the prior art, the general approach is to delete the item that was least recently used (i.e., delete the resource the was used the longest time ago). This approach is not effective for predicting which resources are least needed in the future. Because of the explicit dependencies, the computer-printer system 200 can perform clairvoyant caching of resources to predict the most efficient storage of resources for future data blocks of the document. The resources are managed based on the order in which the resources are used, the amount of space required to store a resource, and the time required to reload a resource if it must be released from the printer resource store 220. The resource loader 214 uses the explicit dependencies to establish a "time line" in which the resource loader looks at the resources currently in the printer resource store 220 and determines which resource will be used farthest out in time. However, as stated above, the resource loader 214 also considers the size of the resource to be deleted and the time required to reload the resource in the future.

As an example of clairvoyant caching, assume that the printer resource store 220 already contains ten resources (generically labeled 1 through 10 for this example), and the printer 218 requires resource number 11 for a particular data block. The resource loader 214 will look at the time line and may determine that resource number 8, for example, will be used farthest out in time. However, if resource number 8 is small in size, its release may still leave the printer resource store 220 without sufficient space to load the required resource number 11. Therefore, the resource loader 214 will look again at the time line to determine the next resource after number 8 that will be used farthest out in time. Resource number 2, for example, could be released. However, if the release of resource number 2 creates more free space in the printer resource store 220 than is necessary, and the reloading of resource number 2 in the future will be very time consuming, the resource loader 214 may look again at the time line to release one or more other resources instead. In this example, the resource loader 214 may release resource numbers 7 and 5, instead of resource numbers 2 and 8, in order to make room in the printer resource store 220 for the required resource number 11. This description simply serves as an example of the various parameters that the resource loader 214 considers in managing the printer resource store 220.

While the resource loader 214 determines the order in which resources are loaded into and released from the printer resource store 220, the actual timing of the resource management is performed by the resource scheduler 216. The resource scheduler 216 may be thought of as the printer operating system. However, as discussed above, the resource scheduler 216 need not be physically located within the printer 218. In a computer-printer system 200 with only one-way communication, the resource scheduler 216 may be located within the host computer 202 and manage the printer memory 222 from the host computer. If the computer-printer system 200 has bi-directional communication, the resource scheduler 216 resides in the printer 218 allowing the printer to manage it own printer memory 222. Because the host computer 202, the printer 218, and the print engine 226 within the printer all operate asynchronously, the resource scheduler 216 must control all timing so that there are no conflicts between the three asynchronous parts. The resource scheduler 216 initiates and controls all printer timing, synchronizes operation with the print engine 226 and decides when a particular resource will be accepted into the printer resource store 220.

The resource scheduler 216 also decides when to delete a particular resource from the printer resource store 220. As previously described, it is the task of the resource loader 214 to specify the sequence of loading and releasing resources. The resource scheduler 216 determines when the printer 218 has no further need for a particular resource which has previously been released by the resource loader 214. Like the resource loader 214, the resource scheduler 216 also has access to the explicit dependencies created by the resource assembler 208. Unlike the resource loader 214, the resource scheduler 216 is only interested in whether the necessary resources for the current page are present in the printer resource store 220.

When all dependencies for the current page are met (i.e., all required resources are present in the printer resource store 220), the resource scheduler 216 generates an execute signal that commits the print engine 226 to printing the page. As will be explained in greater detail below, the print engine must be provided with bit-map data in real-time once the commitment has been made to print a page or the page will not be properly printed because the print engine cannot stop in the middle of the page. It should be noted that a duplexing printer requires an execute signal for each side of the page (i.e., the printing process can stop between sides of the paper). The resource scheduler 216 determines when a real-time commitment can be made to the print engine and generates the execute signal to commit the print engine to printing a page.

The resource scheduler 216 performs similar functions in both one-way and bi-directional communications. In a one-way communication system, the resource scheduler 216 generates a BUSY flag in the hardware interface which indicates printer status to the host computer 202. The resource scheduler also decides when in time a resource will actually be deleted from the printer resource store 218. In a bi-directional communication system, the resource loader 214 manages the printer memory 222 from the printer 218 and makes specific requests to the host computer 202 for particular resources. In addition, the resource scheduler 216 monitors the printing process and informs the host computer 202 when a page has cleared the last paper jam sensor within the print engine 226. Thus, the host computer 202 knows that it no longer needs to retain resources associated with that page to provide error recovery. The resource scheduler 216 may also plan the paper path for a printing task. This is especially important in large printers which have multiple paper bins, multiple paper sizes and paths. Planning the optimal paper path improves the overall efficiency of the printing task.

The resource executor 224 accepts the execute signal from the resource scheduler 216 and converts the RPLs to a bit-map that can be used by the print engine 226 to actually print the page. Other resources may already be present within the printer resource store 220 in bit-map form. The resource executor 224 utilizes the resources, which are currently available in the printer resource store 220, to generate the bit-map. As previously discussed, some printers operate in a banding mode. The computer-printer system 200 of the present invention works with printers operating in a banding mode or a page mode. The resource executor 224 is constrained to real-time operation if a banding mode is used. That is, once a real-time commitment has been made to the print engine 226, the resource executor must convert all RPLs to a bit-map, one band at a time, in real-time or an error will occur. If the printer 218 is operating in the page mode (as opposed to the banding mode), there is no real-time commitment. The resource executor 224 can convert the entire page to a bit-map before transferring the bit-map to the print engine. The computer-printer system 200 of the present invention can operate in either the page mode or the banding mode. The actual conversion of an RPL into a bit-map data file is well known to those of ordinary skill in the art and is not discussed herein.

The print engine 226 accepts the bit-map data from the resource executor 224 and causes the bit-map data to be printed on the page. Use of the print engine 226 is also well known to those skilled in the art and is not discussed herein.

As the bit-map data for one page of the document is processed by the print engine 226, the paper moves through the printer 218. There are a number of sensors throughout the print engine 226 to detect errors such as a paper jam or a low toner condition. Prior art systems retain the bit-map data in printer memory until the page clears the last paper jam sensor. If a paper jam error occurs, the prior art systems have the data already in bit-map form to reprint the page which jammed. If the computer-printer system 200 has bi-directional communication capability, however, the bit-map data is not maintained within the printer 218, but generates error recovery data within the host computer 202. Prior art systems may appear to have faster error recovery than the present invention because the bit-map data is already in the printer memory waiting to be reprinted if a page should jam. However, page jam errors occur so seldom in the normal printing process that it is more efficient for the overall printing process to continue processing data for future pages and not worry about the most efficient technique for error recovery. Rather, the computer-printer system 200 of the present invention is concerned with the most efficient technique for printing the entire document.

Prior art systems cannot promptly process data for the next page because the printer memory is forced to retain the bit-map data until the page has cleared the last paper jam sensor. It takes a typical print engine approximately ten seconds to take a sheet of paper, produce an image on the paper, and drop the paper in a paper tray. The present invention continues to process data for future pages in a document with the expectation that the paper will not jam. During the period of time that the prior art systems are waiting for the printed page to clear the last paper jam sensor, the computer-printer system 200 can assemble resources, translate the PDL into RPLs and manage the flow of resources in the printer resource store 220 for several pages.

In the unlikely event of a paper jam, the host computer 202 reprocesses the page from the beginning. There is no real cost in time since the operator must intervene to physically remove the jammed page or pages if a paper jam does occur. While the operator is removing the jammed pages, the resource loader 214 determines which pages need error recovery and begins to reload the required resources and RPLs into the printer 218. The explicit dependencies simplify the error recovery process because the resource loader 214 looks at the explicit dependency list to determine which resource are needed for the error recovery process. For example, the printer 218 may have jammed the sheets of paper numbered pages two through five, with pages two and three being duplex and four and five simplex. If the printer 218 had previously specified the printing order to be page three (from bottom to top), page two (from top to bottom), page four (top to bottom) and page five (top to bottom), the resource loader 214 will use the explicit dependencies to request resources and RPLs in the most efficient manner to perform the error recovery. These activities may take place while the operator is removing the jammed paper. Thus, the computer-printer system 200 does not lose time in error recovery when compared to systems of the prior art. Furthermore, the efficiency of the printing process is greatly enhanced by assuming that the pages will not normally jam. Thus, the computer-printer system 200 can process a document in a much shorter time than any prior art systems.

As previously stated, the computer-printer system 200 of the present invention can operate with one-way communication from the host computer 202 to the printer 218, or can function with a complete bi-directional communication channel between the host computer 202 and the printer 218. If the hardware of the host computer 202 or of the printer 218 cannot support bi-directional communication, then only one way communication is possible. Even with the limits of one-way communication, the computer-printer system 200 of the present invention is still an improvement over the prior art. In some cases, bi-directional communication may be supported by both the computer system 202 and the printer 218, but the latency time of the bi-directional communication channel is so long that it is impossible to efficiently support full bi-directional communication. In that event, the computer-printer system 200 of the present invention can support limited bi-directional communication between the printer 218 and the host computer 202. This mode, while still not as efficient as full bi-directional communication, is favored over one-way communication. Limited bi-directional communication gives the host computer better error and status reporting than simple one-way communication. The data processing may proceed as if there is only one-way communication, but if an error occurs, the computer-printer system 200 may utilize the error and status information to recover from the error.

Some laser printer systems that use PCL language have provisions for a software cartridge to plug into the printer. The cartridge may contain additional fonts. The computer-printer system 200 may use such a cartridge to provide the printer 218 with the necessary components of the invention that reside within the printer. In one embodiment of the invention, the computer-printer system 200 has the ability to operate in a first mode using the PCL, or it may operate in a second mode using the present invention. In this embodiment, the computer-printer system 200 may automatically switch back and forth between the two modes. This allows the computer-printer system 200 to remain compatible with other applications, such as DOS applications. By switching back and forth between the two modes, the computer-printer system 200 gives greater compatibility with prior art systems.

Another important aspect of the inventive system is the determination of cost metrics. As previously mentioned, the resource assembler 208 (see FIG. 2) determines whether the resource executor 224 can convert the RPLs for a data block in real time. As a further improvement, the resource assembler 208 determines whether the host computer 202 or the printer 218 can convert the RPLs for a data block most efficiently. For the host computer 202 to become involved in the work normally done by the printer 218, the host computer 202 must know ahead of time how long it will take for the printer 218 to process an RPL. The time required by certain printer activities must be considered in deciding what to send to the printer 218 so that the printer does not fail. The present invention solves the problem of knowing how long it takes to print by using a statistical analysis called cost metrics. Using cost metrics allows the host computer 202 and the printer 218 to divide the processing of resources between the host computer and the printer to maximize the throughput of data. Instead of the printer doing all of the work, the host computer 202 now provides processing capabilities during the period before the printer feeds the paper and allows overall print times to be substantially improved. Cost refers to the print time for a page or band of data.

Cost metrics is particularly useful in banding printers where real time constraints are more prevalent. Printers that have sufficient memory to store an entire page of bit-map data have no real-time constraints. However, the present invention is useful in page mode as well because the host computer 202 may still process portions of the RPLs describing the page. If a printer is coupled to a computer network, cost metrics is useful for predicting completion time for an entire printing task. While the following description provides details of operation with printing technology, the inventive system and method of cost metrics is applicable to other areas where cost modeling is useful, such as scheduling a real-time process. Some real-time operating systems require scheduling data including the cost of real-time activities. Cost metrics is also useful in profiling a module of code to construct a cost model for all possible input parameters. Compilers may also use cost metrics to drive their optimization strategies. Printing technology has real-time constraints, but cost metrics is applicable to areas without real-time constraints as well. For example, in a program whose execution time is dependent on input data, prior art systems can only supply input data and determine the cost for that particular input data. In constrast, cost metrics may be used to model the program for all possible types of input data.

In printing technology, the key to cost metrics lies in allowing the host computer 202 to break the data describing the entire page into smaller parts and send the parts to the printer 218 either as fast as possible, but within the data rate that the printer 218 can handle, or using the host computer 202 to process a part into bit-map data before it is sent to the printer. In other words, the host computer 202 may render parts of the data describing a page and send the rendered data to the printer 218. Even if the parts are sent to the printer for processing, the present invention is still faster than prior art systems because the data is in a form that simplifies processing.

Cost metrics provides the cost of each draw primitive for a given RPL or band. This cost is used by the resource assembler 208 to determine whether to send an RPL directly to the printer, send the RPL to the printer 218 to pre-render before a real-time commitment is made, or create a bit-map of the RPL in the host computer 202 and send the bit-map to the printer 218. These three options allow processing of data during times that the printer 218 is not actually printing a page (e.g., during paper feed operations). The result is a substantially reduced overall print time.

Breaking the page into smaller parts may involve banding. As previously described, banding involves breaking the printed page down into a number of horizontal segments called bands. Without banding, printers require large amounts of memory to store an entire page in bit-map form. With banding, the printer need only store the bit-map for a single band, although the printer may store more than one band if it has sufficient memory.

Figure 4:
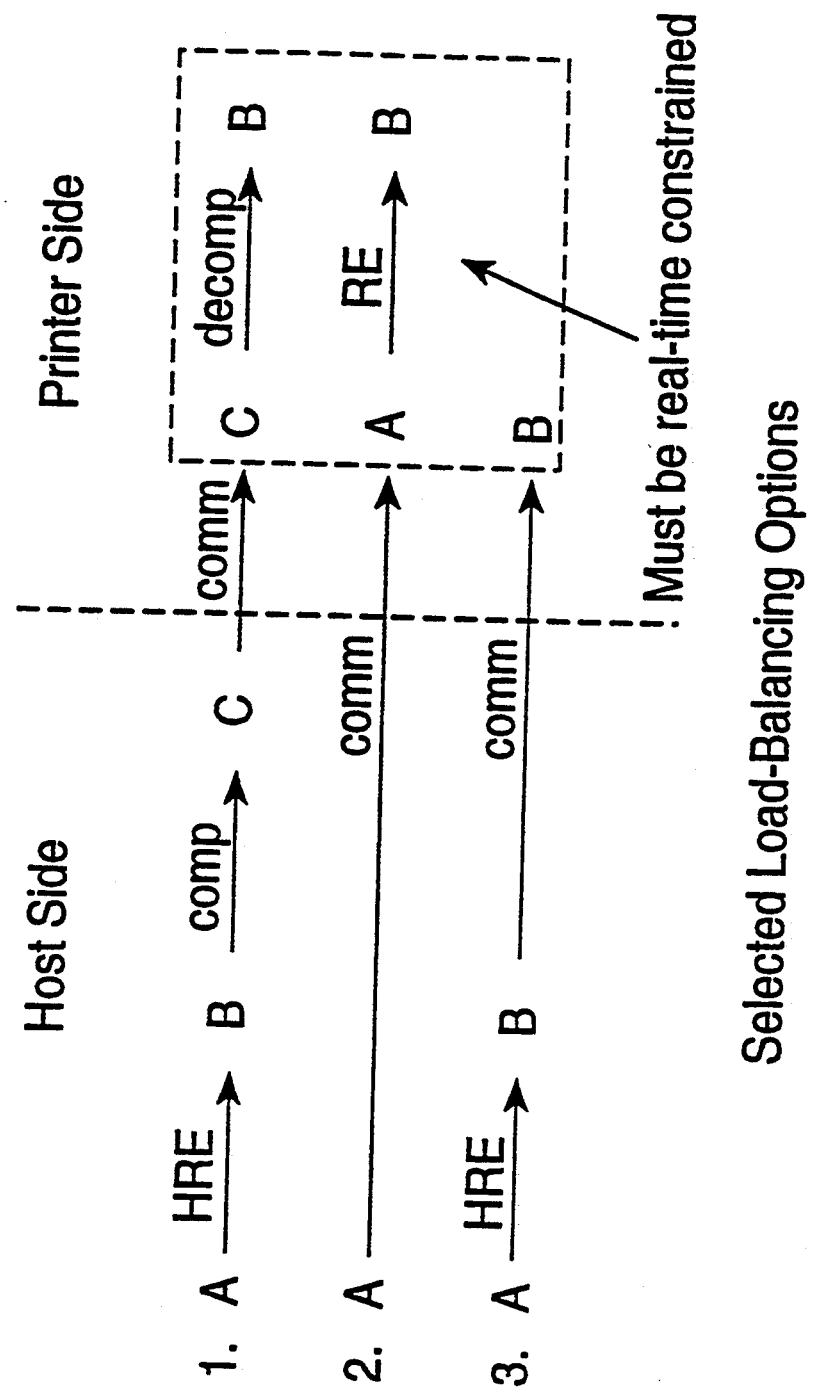
FIG. 4 illustrates some various load balancing options for the present invention.

FIG. 4 illustrates some of the possible options for delivering a band of data to the printer. The A form in FIG. 4 represents a band of data that is described using any number of draw primitives in the form of an RPL. The B form of the data represents a bit-map data file describing the band. Note that the bit-map may be created in either the host computer 202 or the printer 218. In some cases, the host computer 202 may compress the bit-map data file as represented by the C form. As can be seen in FIG. 4, option 1 of the data processing allows the host computer 202 to render the RPL (A form) into a bit-map data file (B form) and compress the data file (C form). The resource assembler 208 acts as a host resource executor (HRE) to render the RPL into a bit-map. The compressed data file (C form) is transmitted to the printer 218 and decompressed back into a bit map (B form) within the printer 218. Alternatively, in option 2 the host computer 202 transmits the RPL (A form) directly to the printer 218. The printer renders the RPL (A form) to create a bit-map data file (B form) within the printer. As a third alternative, the host computer 202 renders the RPL (A form) into a bit-map data file (B form) and transmits the bit-map data file to the printer without compressing the data. The printer 218 receives the bit-map data file (B form), which requires no additional processing except of course for printing.

Options 1 and 3 involve rendering by the host computer 202. The time available to render a band depends on the printer speed and the printer memory 222. Each band has only a limited amount of time in which it must be rendered by the printer 218. If the resource assembler 208 determines that the band cannot be rendered in the allowable amount of time, the host computer 202 will render the band into a bit-map data file. Alternatively, the host computer 202 may send the RPL to the printer 218 to pre-render the RPL before any real-time commitments are made. The ability of the printer to pre-render bands depends on the computing power of the printer 218 and the amount of printer memory 222 available to store bands of bit-map data. Bands that are too time-consuming to be rendered by the printer 218 are called complex bands. Complex bands exceed the allowed print time, which means that the band cannot be printed fast enough to meet real-time constraints. If a band is complex, the host computer 202 will render the band using option 1 or 3 shown in FIG. 4.

In actual practice, the process is complicated by the fact that there may be extra time available for rendering a band while the paper is moving through the printer 218. There may be times that a band can be effectively rendered in real-time if the time that the paper is moving is taken into account. The present invention includes this factor in the determination of whether the printer can render the bands in real-time. It is only when "too many" bands on a page cannot be rendered in real-time that the host computer 202 will render any of the bands. Many factors enter into the determination of how many bands are "too many." For example, the computing power of the printer 218, the speed of the print engine 226 (see FIG. 2), and the amount of available printer memory 222 are factors affecting the determination of how many bands are "too many". In the presently preferred embodiment, each band on a page has 208 scan lines. Thus, the number of bands on a page depends on the page length. It should be noted, however, that the band size selected in the present embodiment is not a limiting factor and may arbitrarily selected or even vary from band to band. Band size, however must be known in advance in order to determine whether a band is simple or complex.

The host computer 202 analyzes the complexity of bands by determining the time required for the exercise of options 1 or 3 plus the time to transfer the data to the printer 218 and compares the total time to the time require for the exercise of option 2 plus the time required to transfer the data to the printer 218. The host computer 202 selects the option having the smallest total time.

There is an upper limit to the number of complex bands that can occur on a page before the host computer 202 simply renders the entire page. Obviously, this limit will vary depending on the relative computing power of the host computer 202 and the printer 218 and the amount of available memory 222. If this limit has not been reached, the host computer 202 will render only the bands that cannot be rendered in real-time by the printer 218. Cost metrics is used to determine whether a band is classified as simple or complex.

Figure 5:
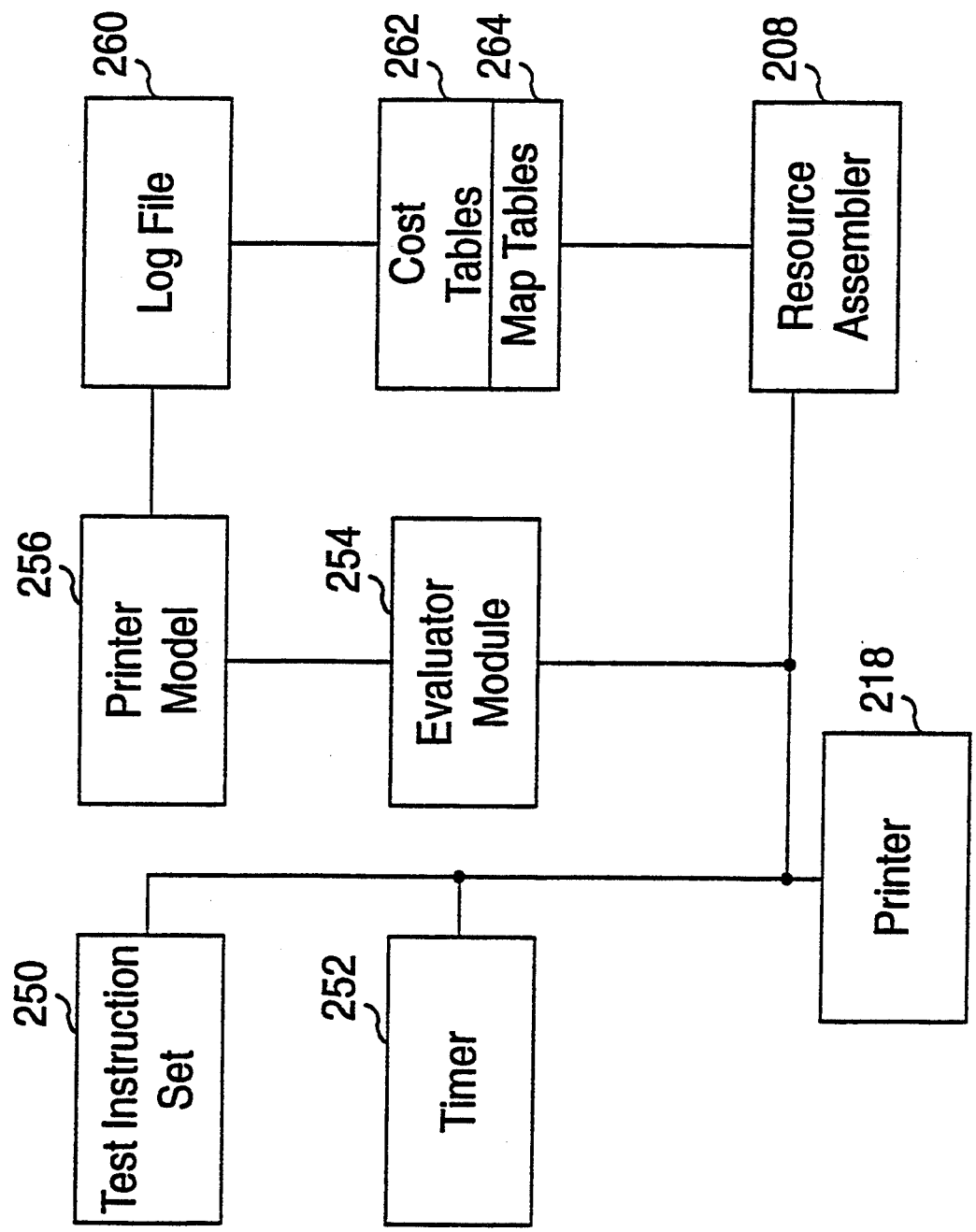
FIG. 5 is a functional block diagram of the inventive cost metrics system.

As best seen in FIG. 5, the cost metrics system establishes execution times for a variety of draw primitives using a variety of raster operation codes (ROPs). The draw primitives are stored as a test instruction set 250. It should be noted that the predetermined period includes the time required to execute a primitive that may be executing when the 300 msec period expires. The test instruction set may comprise all possible draw primitives or may be a subset of all possible draw primitives. The ROPs are a set of functions that define the way in which bits in a source code bit-map are combined with the bits in a brush bit-map and the bits in a destination bit-map.

In the present embodiment of the invention, there are 256 different ROPs which are represented by eight data bits. The ROPs may be grouped into three types depending on the number of arguments that are received. The types of ROPs are shown in Table 1 below.

TABLE 1

| ROP Types | |
|---|---|
| ROP Types | Arguments that are used |
| 2 | destination, pattern |
| 3 | destination, pattern, source bit map |
| 4 | destination, pattern, source bit map, mask |

The computer-printer system 200 calculates a series of execution times for various draw primitives at the time the printer 218 is installed on the computer 202. Alternatively, the cost metrics may be predetermined and the cost information for particular printers provided to the resource assembler 208 as a run-time binary file. The inventive system may also be used to benchmark performance of a printer. A timer 252 is used to measure the execution times for the various draw primitives. By measuring the execution times for the test instruction set 250, a evaluator module 254 establishes a printer model 256 representative of the particular printer 218. The printer model 256 is used to construct a log file 260, which contains the cost metrics data for the particular host computer 202 and printer 218 combination. To simplify the cost metrics data, the data is clumped and stored in a set of cost tables 262. The cost tables 262 contain cost metric data for certain classes of draw primitives. This requires far less memory than a data file including complete cost metrics data for all possible draw primitives. A set of map tables 264 provide a simple means of accessing cost data in the cost tables 262. The cost tables 262 and map tables 264 are attached to the resource assembler 208, which uses the cost data to determine the cost of each RPL at the time that a document is to be printed. Thus, the cost metrics data, which has been predetermined, may be used to dynamically share the data processing responsibility between the host computer 202 and the printer 218.

Figure 6:
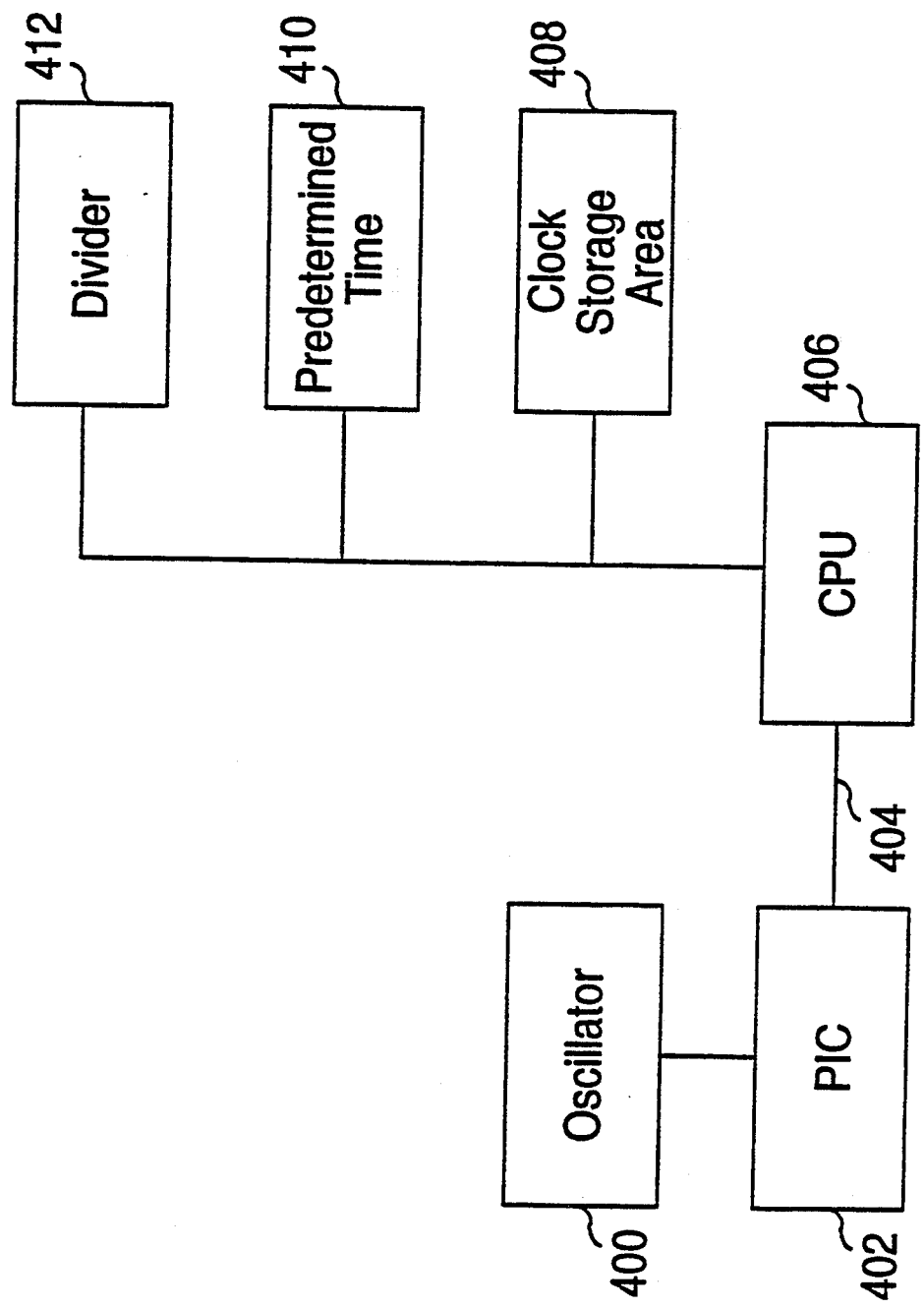
FIG. 6 is a functional block diagram of the timer used by the present invention.

The timer 252 is used to determine the cost of execution of the test instruction set 250. In the present embodiment, the timer 252 uses the internal time keeping capability readily available on typical computers. As shown in FIG. 6, typical computers use an oscillator 400 with a frequency of approximately 1,193,180 Hertz. The period for this frequency is 838.0965 nanoseconds. For purposes of this application, we will define a clock tick as 838.0965 nanoseconds. A programmable interval counter (PIC) 402, which contains a 16-bit counter, decrements itself by two every clock tick. The PIC 402 is programmed by the computer operating system to continuously count down from 65535 to 0, at which point the PIC 402 toggles the interrupt line 404 to the CPU 406. The CPU 406 responds only to the rising edge of the interrupt line 404. However, because the PIC 402 decrements by 2 every clock tick, an interrupt is generated by the PIC 402 approximately every 55 milliseconds. In response to the interrupt, the CPU 406 increments the value of the clock storage area 408. By using the combined counters in the PIC 402 and the clock storage area 408, it is possible to have a 48-bit counter with 838.0965 nanosecond resolution.

The present invention repeatedly executes the same draw primitive for a predetermined time 410 and counts the number of times that the draw primitive was executed. A divider 412 divides the elapsed time as measured by the internal time keeping circuitry of the computer by the number of draw primitives executed to determine the cost per draw primitive.

The easiest way to measure time on the host computer 202 (see FIG. 2) is to call the date/time function in DOS. This is the approach commonly used. Another method is to call a BIOS function to find out the number of 55 millisecond clock ticks occurring since midnight. The problem with this method is that if the program runs overnight, a midnight event can be lost and the data/time will be one day late. The present invention uses a third approach. Since the inventive system requires a finer resolution than 55 milliseconds, it uses the hardware timer 252 (see FIG. 5) on the host computer 202 to decode the amount of time used to render draw primitives. Specifically, the programmable interval controller (PIC) 402 (see FIG. 6) check that drives the previously mentioned BIOS function is used to measure time. This allows the system to obtain a much finer resolution timer. Instead of 55 milliseconds, it is possible to achieve a theroretical resolution of approximately 838 nanoseconds because the hardware timer is a 16-bit timer and (55 milliseconds)/65536 is 838 nanoseconds. Note however that the communication link with the printer has some randomness, and in practice we can only achieve 10 microsecond resolution. All of the above numbers are round numbers. The timer 252 is much more precise than these round numbers indicate. The present invention uses a combination of the BIOS counter and the PIC to provide the timer 252 used to measure the execution times of draw primitives.

The PIC 402 has three count-down timers (not shown) that are clocked at a constant rate. The PIC chip counters use a value of 65536 and count down. When the counters reach zero on the PIC they start a process. For Timer 0 this means generating an interrupt (Vector 8H, 20-23H). The original value is loaded into the counter and the process continues. BIOS increments a ULONG count at location 40H:6CH. This counter represents the number of ticks that have (or should have) occurred since the last midnight event (12 o'clock midnight). This BIOS counter is updated by the timer tick, by the real-time clock (at bootup), and by the MS-DOS "TIME" command whenever the real-time clock is changed. At midnight. The BIOS counter "rolls over" and starts again from zero. There are 1,573,040 timer ticks in one 24 hour period. The BIOS counter may contain values from 0 to 1,573,039.

There is a BIOS call to obtain this counter, but it cannot be used in this application because if a "midnight event" has occurred, it will return this condition to the caller and forget about it. Handling the "midnight event" is a difficult process that the present invention has chosen to avoid. Normally, overflow conditions are handled by MS-DOS. If the BIOS call is used and the overflow condition occurs, there is no way to funnel this event back into MS-DOS except to set the date forward by one day. The logic for this is too complicated.

Instead, the timer 252 simply looks at the BIOS area and reads the 4 byte tick counter, but remember, the tick counter will be reset back to zero at midnight. It is important to ask MS-DOS to do something that requires it to make this BIOS call at least every 24 hours. An example of this is writing to a file because MS-DOS needs to update the file's modification time.

Synchronizing the host computer 202 with the timer 252 to measure costs involves using timer 0 (not shown) of the PIC 402. Timer 0 drives the system clock. Timer 0 is programmed to operate in Mode 3—the square wave rate generator. This means that the output will remain high (first phase) until one half the count has been completed (for even numbers) and go low (second phase) for the other half of the count.

If the count is odd and the output is high, the first clock pulse (after the count is loaded) decrements the count by 1. Subsequent clock pulses decrement the clock by 2. After a timeout, the output goes low and the full count is reloaded. The first clock pulse (following the reload) decrements the counter by 3. Subsequent clock pulses decrement the count by 2 until timeout. Then the whole process is repeated. In this way, if the count is odd, the output will be high for (N+1)/2 counts and low for (N−1)/2 counts. One can read the count by using PIC_LATCHIT to latch a counter, and then reading the value, but merely reading the value does not indicate whether time 0 is on the first phase or second phase of the cycle. The only way to tell is to wait for the counter to roll over and see if a clock is generated.

The square wave rate generator (time 0) is hooked up to Interrupt Vector 8H (vector address 20-23H). This normally points into BIOS which also calls another timer tick interrupt vector at 1CH (vector address 70-73H). Normally, 1CH points to a DUMMY_RETURN. If Vector 8H is simply replaced, the System Clock will not function properly. Vector 8H must be called every 18.2 milliseconds.

There are two 16-bit values in the BIOS area and one 16-bit value in the PIC chip for a total of three USHORTs. Each USHORT fetch is atomic, but an interrupt can occur between any of these fetches so there is no way to construct a clean 48-bit atomic access using these point alone. For example, if interrupt occurs between the first fetch and the second fetch, we may read 000BFFFF instead of the more correct 000AFFFF or 000B0000. Either of the last two is permissible, but the first one is way off, and would, of course, lead to improper timing.

Since the timer interrupt only occurs once every 18.2 milliseconds, we can easily read the BIOS area twice and return a value that is repeatable (we could also disable interrupts or do a 32-bit access using 386 or 486 registers, but disabling interrupts doesn't stop the PIC counter).

To solve this problem we first construct a safe 32-bit number access for the BIOS area. Since the BIOS area is only updated every 18.2 ms, we can simply read it twice and make sure it didn't change. The values read from the BIOS are ulBIOS1, and ulBIOS2. The values latched from the PIC counter are usPic1, usPic2, etc.

The procedure for accessing the PIC 402 is first to write your intentions to PIC_CONTROL_PORT, and then read or write one or two bytes to the appropriate TIMERx port (on the PIC):

It is important in this application that we measure the difference between the start and stop accurately. Whether we wasted a few milliseconds before or after the test is not very important. To accomplish this, we will wait until the timer "rolls over" before returning to the application. Then, when the stop timer call is made, we have a more accurate measurement of the time inbetween. Since the PIC is decremented by 2, the least significant bit is always zero and therefore meaningless. When PIC 402 reaches zero, OUT0 is toggled and the PIC is reloaded. Interrupts only occur on every other OUT0 transition. So, there only the 15 highest bits of PIC are significant, and there is another bit (OUT0) that is not available and must be derived through detective work.

The only way we have of observing this hidden bit is to wait for the 15-bit PIC counter to roll over, and then look to see if the 32-bit counter in BIOS memory changes. That is, if the hidden bit is '1,' then the carry will propagate through, otherwise, the carry will not propagate. There is some extra caution we must impose because the 15-bit PIC counter is a hardware counter. It cannot be stopped, and it runs asynchronously from our program. Any interrupts that it causes will not be processed immediately by the CPU. There is delay, and the delay is unpredictable.

The timer 252 may also be used without other aspects of cost metrics for measuring code execution times. This is particularly useful for such applications as profiling code to measure execution times.

The evaluator module 254 uses the timer information to obtain the cost metrics. The goal of the evaluator module 254 is to determine the cost of a single draw primitive. As previously discussed, the resolution of typical timers is not sufficient for purposes of the present invention. The timing resolution over the communication channel to the printer has a repeatable resolution of approximately 10 microseconds, but the required resolution is less than 1 nanosecond. To achieve the required resolution, the printer 218 is asked to execute a number of draw primitives. The number of primitives may exceed 10,000.

The evaluator module 254 begins by requesting that the printer 218 perform a few draw primitives. It should be noted that the same draw primitive, with the same parameters, ROP, shape and brush are used. The number of primitives that are executed is increased until a predetermined time 410 has elapsed. The evaluator module 254 evaluates the number of draw primitives executed during the predetermined period of time in order to calculate the amount of time required to execute that particular primitive using that particular ROP, a shape and a particular brush. In other words the evaluator module 254 determines how many draw primitives are executed in the predetermined period to determine how long it takes to execute a single draw primitive of that type. This procedure for a particular draw primitive is called a sample.

The evaluator module 254 determines samples for various types of draw primitives. In the presently preferred embodiment, the evaluator module 254 chooses a predetermined time of approximately 300 milliseconds. With a timer accuracy of 10 microseconds, this results in a maximum error of approximately 0.0033%. The time that it takes to determine a sample is relatively constant. If the draw primitives are simple, the evaluator module 254 must send a few more draw primitives during the predetermined period. If the draw primitives are relatively complex, the evaluator module will send less draw primitives during the predetermined period. Thus, the only variable is the number of primitives sent during the predetermined period. As can be readily seen, virtually any resolution may be achieved by varying the predetermined time 410. For example, using a test period of approximately 3,000 milliseconds (3 seconds) will give a resolution of 0.00033%. In the presently preferred embodiment, a predetermined time of approximately 300 milliseconds was selected to minimize the time required to execute the test instruction set 250.

The printer model 256 instructs the evaluator module 254 as to which draw primitives from the test instruction set 250 to send to the printer 218. The printer model 256 used the same data to model the particular printer 218 installed on the host computer 202. The model for a particular printer is developed by determining the cost to perform various functions. It may take 1, 5, 10, or more samples to determine the cost of various functions. The printer model 256 may use least-linear-square regression (LLSR) statistics to find the slope or intercept of certain cost curves. This techniques is well known to those of skill in the art and will not be described in detail. Simply put, LLSR is a statistical method for selecting a "best" line to fit a series of points. The line is a model of the points. If the model is "good", then the points will very close to the line. The present invention uses LLSR in a variety of ways. For example, the evaluator module 254 uses LLSR to find the cost per draw primitive. The printer model 256 uses LLSR to fit the data to the model for draw primitives by keeping all but one variable constant. This allows the printer model 256 to isolate the effect of that variable from the others. The application of LLSR to the printer model 256 will be discussed in detail below.

In general, there is a cost associated with anything that the printer 218 does. For example, there is the cost of rendering the primitive into a bit-map data file for a particular band. In addition, there is the cost for marking a particular dot on the page, and a cost for filling in a row on the page. The cost for rendering a primitive will be referred to as P, while the cost for a dot and a row are referred to as D and R, respectively. The printer model 256 determines cost information for executing various draw primitives of different dimensions. A zero dimension primitive has only one cost to be characterized. Other primitives have one or more dimensions and one or more costs that need to be characterized. Table 2 below shows the draw primitives and their associated costs.

TABLE 2

| Render Primitives and Associated Costs | | |
|---|---|---|
| Render Primitive | Number of Dimensions in the primitive | Associated Costs |
| line | 0 | Primitive Cost |
| glyph | 1 | Primitive and Dot Cost |
| rectangle, wedge | 2 | Primitive, Dot, and Row Cost |
| glyphBDN | 3 | Primitive, Dot, Row, and Multiple Glyphs |

Zero dimension primitives have the same execution time regardless of the ROP, brush, drawing position, or pen style. Examples of zero dimension primitives are cursor movement commands such as SetRowAbsolute (SetRowAbs); or SetColumnAbsolute (SetColAbs). The SetRopAndBrush primitive is also a zero dimension primitive, but it is a unique case because it needs to be enumerated 1,024 times because there are four possible brushes and 256 possible ROPs (4×256=1,024).

One dimensional primitives depend on a single variable such as width or length. As previously mentioned, the printer model 256 uses LLSR to determine the best fit line to characterize the parameters associated with the primitive. It generally takes five samples to determine the best fit. An example of a one dimensional primitive is LineAbsolute (LineAbsS) which is a primitive to draw a line.

Two dimensional primitives depend on two variables such as width and height. It generally takes ten samples to properly characterize these primitives An example of a two dimensional draw primitive is Rectangle (Rect) which draws a rectangle.

There is only one three dimensional primitive, (GlyphBDN). This primitive generally requires fifteen samples to adequately characterize it. The GlyphBDN primitives depends on the three variables height, width and number of subglyphs. A sub-glyph is a glyph contained within the GlyphBDN draw primitive. While the GlyphBDN is considered a single primitive, it can have many sub-glyphs each with their own width and height. The cost of drawing a GlyphBDN primitive varies depending upon whether it is used to draw one glyph or many glyphs.

The current presently preferred embodiment makes several assumptions about operation of a particular printer. These assumptions reduce the number of models required for various primitives. Specifically, the invention assumes that the cost for rendering a particular primitive (P), the dot cost (D), and the row cost (R) are constant for any given printer. This allows the various dimensions of primitives to be characterized by the equations in Table 3 below.

TABLE 3

Table of Execution Model for primitives of various dimensions.

| Dimension | Execution Model |
|---|---|
| 0 | $t = P$ |
| 1 | $t = P + wR$ |
| 2 | $t = P + wR + whD$ |
| 3 | $t = P + nN + \sum_{i=1}^{n}(w_iR + w_ih_iD)$ | where:

t is the total time required, P is the time required to execute the primitive, h is the height of the object, R is the row cost, w is the width of the object, D is the time required to touch a dot, n is the number of sub-primitives of a primitive, and N is the cost of processing a sub-primitive.

To determine the cost of a primitive, the system selects one of the models corresponding to the dimension of the primitive to be rendered. For example, to determine the cost of a two dimensional primitive, the system uses two phases of calculations.

In phase one, we want to isolate parameter D. To do this, it is possible to use LLSR and keep w constant. By varying only h, we are able to isolate parameter D.

Using the formula for two dimensions from Table 3, the total cost for a draw primitive is given by the formula:

$$t = P + wR + whD.$$

Assume that:

$$K_1 = P + wR$$

$$K_2 = wD.$$

Then, $$t = K_1 + K_2 h.$$

By taking five samples of various h and using LLSR, the system can find the two constants. Because the value of w is known, it is possible to determine D.

In phase two, we want to isolate parameter R. To do this, it is necessary to keep h constant and vary w. The equations are now:

$$t = P + wR + whD$$

in which w will be varied. In order to create a set of sample that only varies with w, it is necessary to subtract the whD term from every sample. This results in:

$$\tau_{llsr} = t_{sample} - whD$$

where $t_{llsr}$ is the time used by the LLSR analysis and $t_{sample}$ is the sample time determined by the evaluator module 254. This results in a simple equation that is easy to fit data in the LLSR analysis. It is possible to do this because D is known from Phase one, and w and h are also known for every sample.

Assume that:

$$K_1 = P$$

$$K_2 = R.$$

Then, $$t = K_1 + K_2 w.$$

By taking five samples of various w and using LLSR, the two constants can be found. The two constants are P and R. Thus, the two phases allow the determination of the parameters P, D, and R. The cost for the primitive can then be determined for any width and height.

The number of dimensions in a render primitive affect the number of tests in a sample and the total test time required per sample. To calculate the execution cost for all the drawing primitives, the system uses 1, 5, 10, or 15 test points for the height and the width during phases one and two. The values selected result in increasing execution times from 300 to 1500 milliseconds depending on the number of test points evaluated. Table 4 shows the relationship between dimensions and test time. To minimize the testing time, a number of small draw primitives are sent to the printer 218 by the evaluator module 254 for each test point and gradually increased in size until approximately a 300 millisecond print time is reached. After a print time of 300 millisecond is reached, the test point is recorded and the test proceeds to the next test point. This process is repeated until the test points have been tested.

TABLE 4

Test Times for characterizing primitives.

| Number of test values | Number of dimensions in resource primitive | Test time |
|---|---|---|
| 1 | 0 (line) | 300 ms |
| 5 | 1 (glyph) | 1500 ms |
| 10 | 2 (rectangle, wedge) | 3000 ms |
| 15 | 3 (glyphBDN) | 4500 ms |

When the printer model 256 creates the cost data as described above, the cost data is stored in the log file 260. To simplify the data retrieval process, the cost data in the log file 260 is classified and stored in the cost tables 262. The classification process simplifies the data structure required to store cost data. The present embodiment makes several assumptions that simplify the classification process. In many cases, it is known that the same code within the printer is used to draw different primitives. For example the same code that draws the GlyphB1 draw primitive is used to draw the BitmapHR draw primitive. Because of this redundancy in the code, the system need only store cost data for one primitive. Some draw primitives that the resource assembler 208 does not use, such as GlyphB1, do not need to be measured.

Analysis of the dot costs also indicates that for a particular ROP and brush, the dot cost is the same from one draw primitive to another. That is the cost per dot for the draw primitive Rect, ROP0, black brush is the same as the cost per dot for the draw primitive Glyph, ROP0, black brush. Therefore, there is not a different dot cost for each draw primitive, but for each ROP and brush combination. With four brushes and 256 ROPs, there are 1,024 possible dot costs.

To simplify the classification, the system uses a clumping scheme to classify the primitives. Clumping referes to a process that reduces the number of data entries by grouping or clumping draw primitives that have similar costs. The present embodiment of the invention calculates the cost of the primitive parameters P, D, and R, for all draw primitives and groups them into broader categories. When a group of similar draw primitives such as SelectL, SelectB, and SelectS have three different costs, it is only necessary to include the most expensive cost of the three. Since these commands are used relatively infrequently, the deviation is of little consequence. Where there are different forms of a primitive, it is only necessary to classify the most costly form and use that cost for the other forms. In all cases, the cost tables 262 contain the higher cost so that a printer error will not occur by assuming that the printer can render a band in real-time only to discover that it cannot. Note that this classification scheme is presented only as a means for reducing the memory required for the log file. It is possible, but not practical, to include the actual costs for all possible primitives.

The log file 260 contains the cost metrics data for all parameters for each of the draw primitives. As an example of the clumping process, assume that a group of draw primitives have the following costs for the parameter D: 1, 2, 2, 2, 5, 5, 6, 9, 10, 10. Instead of having ten data entries, the system may create three clumps of 2, 6, and 10. The first four draw primitives are assigned to the first clump with a cost of 2, the next three draw primitives are assigned to the second clump with a cost of 6, and the final three draw primitives are assigned to the third clump with a cost of 10. Note that this results in some inaccuracy since some draw primitives have actual costs that are less than the clump cost to which they are assigned. However, the number of clumps is variable and is selected so that the amount of error is minimized. Also note that a draw primitive is never assigned to a clump that is less than the actual cost. This assures that the clump costs never underestimate the actual cost. Underestimating the actual cost could result in a printer error if the resource assembler 208 determines that an RPL can be rendered in real-time due to underestimating the actual cost. In the case of the 1,024 cost data entries for dot costs, actual experience indicates that these may be represented by only 40 clumped dot cost data entries.

The process of clumping is performed by arranging all costs for a certain parameter in a row arranged from the lowest cost to the highest cost. Subtract each cost data entry from its neighbor, and store the difference in an array. An offset value for each array entry keeps track of the actual cost. Then sort the difference array from largest cost to smallest cost. The first entry in the sorted array is the clump data cost for one clump. The second entry in the sorted array is the clump cost if two clumps are used. The third entry in the sorted array is the clump cost if three clumps are used and so forth.

As an example of the clumping process, assume we have the following costs for the parameter D: 1, 2, 2, 2, 5, 5, 6, 9, 10, 10. When each cost is subtracted from its neighbor you get the following array: 1(2-1), 0(2-2), 0(2-2), 3(5-2), 0(5-5), 1(6-5), 3(9-6), 1(10-9), and 0(10-10). The array is then arranged in sequential order from largest to smallest, and if two numbers are the same, the difference number associated with the highest cost is listed first. In the above example, the sequentially arranged difference array is 3, 3, 1, 1, 1, 0, 0, 0, 0. The first numeral 3 in the difference array is associated with the cost difference between 9 and 6, while the second numeral 3 is associated with the cost difference between 5 and 2. Therefore, if there are two cost clumps, the clumps are divided by the cost difference associated with the first numeral in the sequential difference array. In this example, the two clumps are divided between the 6 and 9 cost numbers associated with the first numeral 3. Therefore, one clump will contain costs from 9-10, while the second clump will contain costs between 1-6. Similarly, if three cost clumps are used, the second and third clumps will be divided between the 2 and 5 cost numbers associated with the second numeral 3. Thus, the cost clumps will be 9-10, 5-6, and 1-2. This principle may be extended to any number of cost clumps. Alternatively, statistical processes such as histogram analysis may be used to determine the most appropriate clump costs.

The clumped data entries are stored in the cost tables 262. A corresponding map table 264 is used to simplify access to the cost tables. For example, the 40 dot cost data entries are stored in a cost table having relative locations from 0 to 39. Note that in actual practice, the cost tables may located in any convenient location within the host computer 202. The dot cost map table contains 1,024 entries (4×256) each of which contains a number ranging from 0 to 39. The entry in the map table 264 corresponds to an entry in the dot cost table, which is part of the cost tables 262.

The resource assembler 208 uses the map tables 264 and the cost tables 262 to determine the costs of each draw primitive. In one procedure, the resource assembler 208 could access the dot cost tables every time a draw primitive operation involves dot costs. A total cost could be accumulated. The total time is the cost data entry in the cost table times the number of dots of that particular type. However, calculating total cost in this manner requires a multiply operation for every draw primitive within a band. As is well known to those of ordinary skill in the art, multiply operations are time consuming. Therefore, the presently preferred embodiment uses 40 dot counters for each band (one dot counter for each of the 40 clumped dot costs). Whenever an operation involves a dot, the resource assembler 208 adds to the corresponding one of the 40 dot counters. At the end of the band, the resource assembler 208 multiplies the dot total in each of the 40 dot counters times the cost data entry in the cost table 262 for the corresponding dot. Then the forty multiplied values are totaled to give the total dot cost for the band. This procedure involves far fewer multiplies than the first procedure. Also note that in a given band, some of the forty dot counters may have a value of zero, which can be checked for before executing a multiply operation. This saves additional time in calculating total dot cost. In similar fashion, other costs for draw primitives are calculated to give the total cost for a band.

The resource assembler 208 determines the total cost for the band and compares the total cost with the time available to render the band within the printer 218. If the printer has sufficient time to render the band, the RPL data for that band is not rendered by the host computer 202. If a band is too complex for real-time rendering, the band is marked as a possible candidate for pre-rendering by the printer 218. When the cost for the entire page has been calculated by the resource assembler 208 using the cost metrics procedures described above, the bands are checked to see if the number of complex bands exceeds a predetermined number. As previously stated, the number of complex bands that is considered "too many" depends on numerous factors such as the computing power of the printer, the print engine speed, the overhead costs of the printer, and the amount of printer memory 222 (see FIG. 2) available to store band data. If there are relatively few complex bands on a given page, the complex bands are sent to the printer 218 for pre-rendering. In this way, all of the complex bands are pre-rendered before the printer makes a real-time commitment to the print engine 226. The resource assembler 208 may also render some of the complex bands and send the bit-map data for those bands to the printer 218. If there are too many complex bands, the resource assembler 208 will render the entire page.

As an example of the cost calculation process, assume that we wish to draw a rectangle at a specific location on the page using ROP0 and a black brush. The rectangle will have a width, w, of 10 and a height, h, of 10. The following set of draw primitives may be used to create such a rectangle: SetRowAbs( . . . ), SetColAbs( . . . ), SetExtAbs( . . . ), SetRopandBrush( . . . ), and Rect(w,h). For simplicity, the values of the arguments for most of the draw primitives have not been included.

The following steps are used to achieve a total cost for this RPL:

1. Find the cost metrics for the first three render primitives by going into the clump table and obtaining the values P, R and D for the specified parameters. Add the costs of P, R and D. The values for these primitives are the following: For SetRowAbsS ( . . . )=123.647 microseconds, SetColAbsS ( . . . )=23.665 microseconds, and SetExtAbsS ( . . . )=23.664 microseconds.
2. Find the cost metrics for the ROP specified by the SetRopAndBrush combination (ROP number 41). The values are 224.633 microseconds for P, 11.292 microseconds for R, and 0.04 microseconds for D. The total cost of the ROP and brush combination is 341.6 microseconds (after 341.6 microseconds, the bits for the rectangle are in the frame buffer ready to be printed.) Note that the driver keeps track of the ROP and brush combinations that have been looked up in the BID table. If doesn't look up the value for the combination again if it has previously been used.
3. Add the cost of the ROP and brush combination to the cost of all the drawing primitives in the RPL list: 341.6+123.647+23.665+23.664=512.576 microseconds. This is the total cost of the RPL.

Because resources are used to print data, the cost metrics is particularly useful in printing technology.

The host computer 202 creates the resources, and the dependencies of resources. By translating the resources into draw primitives, the cost of executing each of the draw primitives can be calculated by the host computer 202. The system described herein allows the resource assembler 208 easy access to the cost data at run-time. The time available for pre-rendering by the printer 218 is calculated into the cost metric data. The resource assembler 208 uses the cost metric data to make decisions about which part of the host computer-printer system 200 should process the data. The use of cost metrics allows the host computer 202 and the printer 218 to share data processing responsibilities in a not previously possible.

Figure 7A:
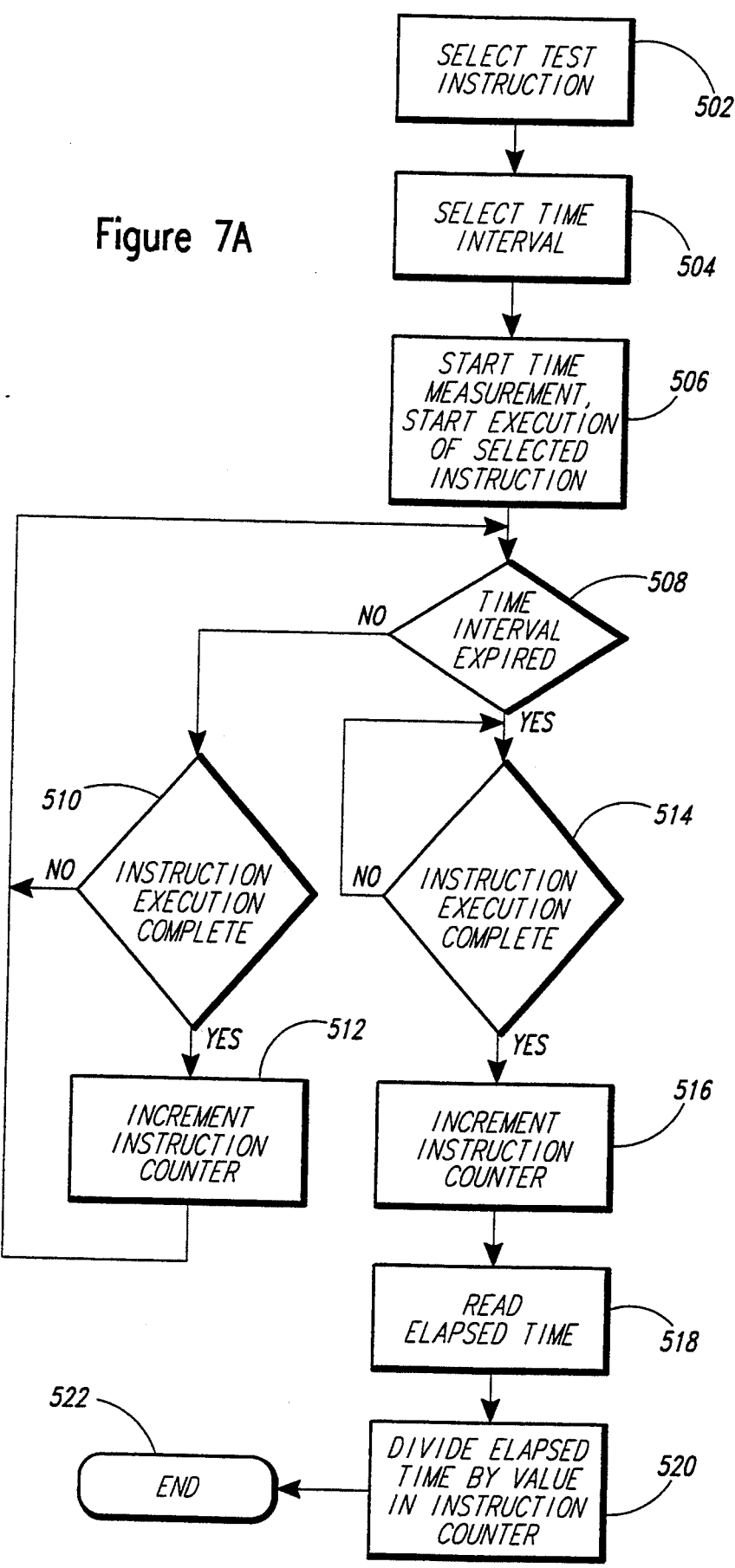
FIG. 7A is a flowchart of the operation of the system of FIG. 2 used to determine execution cost for selected test instructions.

The flow charts of FIGS. 7A–7E provide a step by step illustration of the operation of the system 200 as described above. FIG. 7A illustrates the operation of the system 200 to determine the execution cost for a selected test instruction. In step 502 the system selects a test instruction for execution. In step 504 the system selects the desired predetermined time interval 410 (see FIG. 6). In step 506, the system 200 begins counting the elapsed time and begins repeated execution of the selected instruction. In decision 508, the system determines whether the predetermined time period has expired. If the predetermined time period has not expired, the result of decision 508 is NO and in decision 510, the system 200 determines whether the execution of the selected instruction has been completed. If the execution of the instruction has not been completed, the result of decision 510 is NO and the system 200 loops back to decision 508. If the execution of the selected instruction has been completed, the result of decision 510 is YES, and in step 512, the system 200 increments an instruction counter containing a value indicative of the number of instructions executed during the predetermined time period.

After the completion of step 512, the system returns to decision 508 and awaits the expiration of the predetermined time period. If the predetermined time period has expired, the result of decision 508 is YES, and in decision 514 the system 200 determines whether the execution of the current instruction has been completed. If the execution of the current instruction has not been completed, the result of decision 514 is NO, and the system loops back to decision 514 until the currently executing instruction is completed. If the currently executing instruction has been completed, the result of decision 514 is YES, and in step 516, the system 200 increments the instruction counter. In step 518, the system 200 determines the elapsed time. The elasped time includes both the predetermined period and any period of time required to complete the execution of the instruction executing when the predetermined period of time expired. In step 520, the system 200 divides the elapsed time by the value contained within the instruction counter. The system 200 ends the determination of the execution time in step 522. Thus, the system 200 can determine the execution time for a single instruction.

Figure 7B:
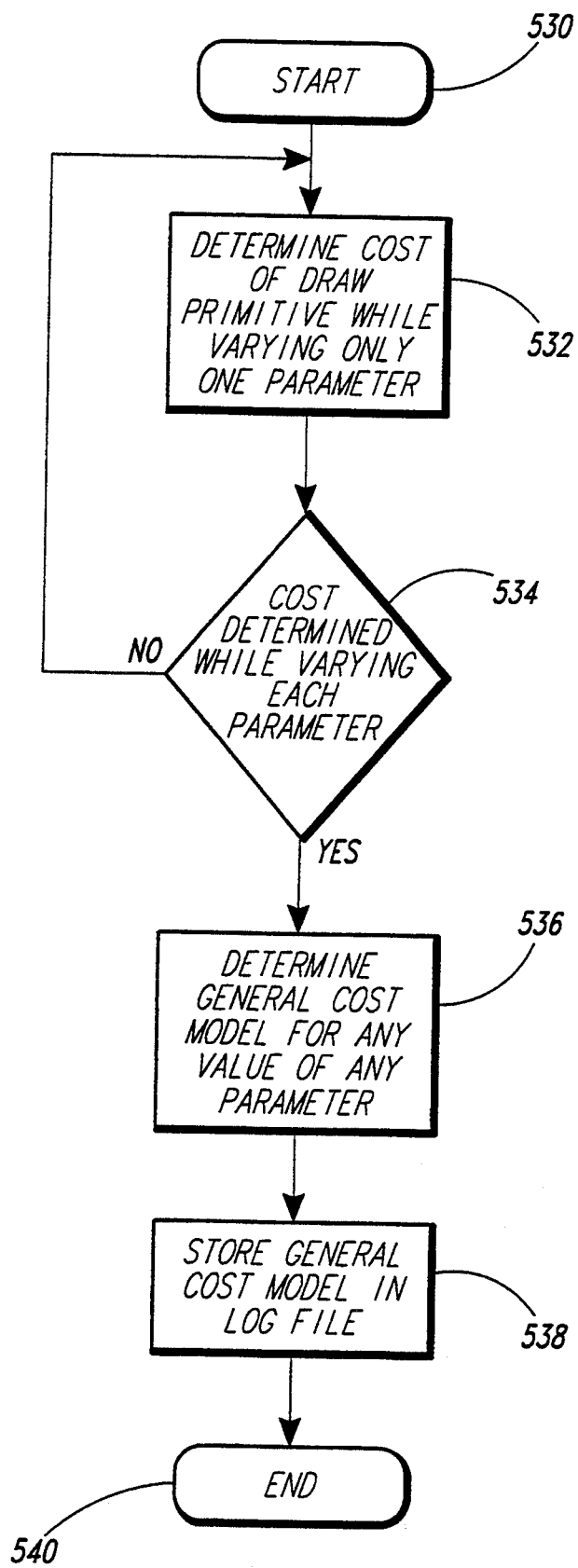
FIG. 7B is a flowchart of the operation of the system of FIG. 2 used to determine a general cost model.

FIG. 7B illustrates the operation of the system 200 in determining a general cost model. The system 200 starts at step 530. In step 532, the system 200 determines the cost of a draw primitive while varying only a single parameter. In decision 534, the system 200 determines whether a cost has been determined for each parameter. If a cost has not been determined for each parameter, the result of decision 534 is NO and the system 200 returns to step 532 to determine the cost of a draw primitive while varying individual parameters. If all parameters have been varied, and a cost determined, the result of decision 534 is YES and in step 536, the system 200 determines a general cost model for any value of any parameter. In step 538, the system stores the general cost model in the log file 260 (see FIG. 5). The system 200 ends the determination of a general cost model in step 540. The general cost model may be used to determine the cost of any drop primitive for any value of any parameter.

Figure 7C:
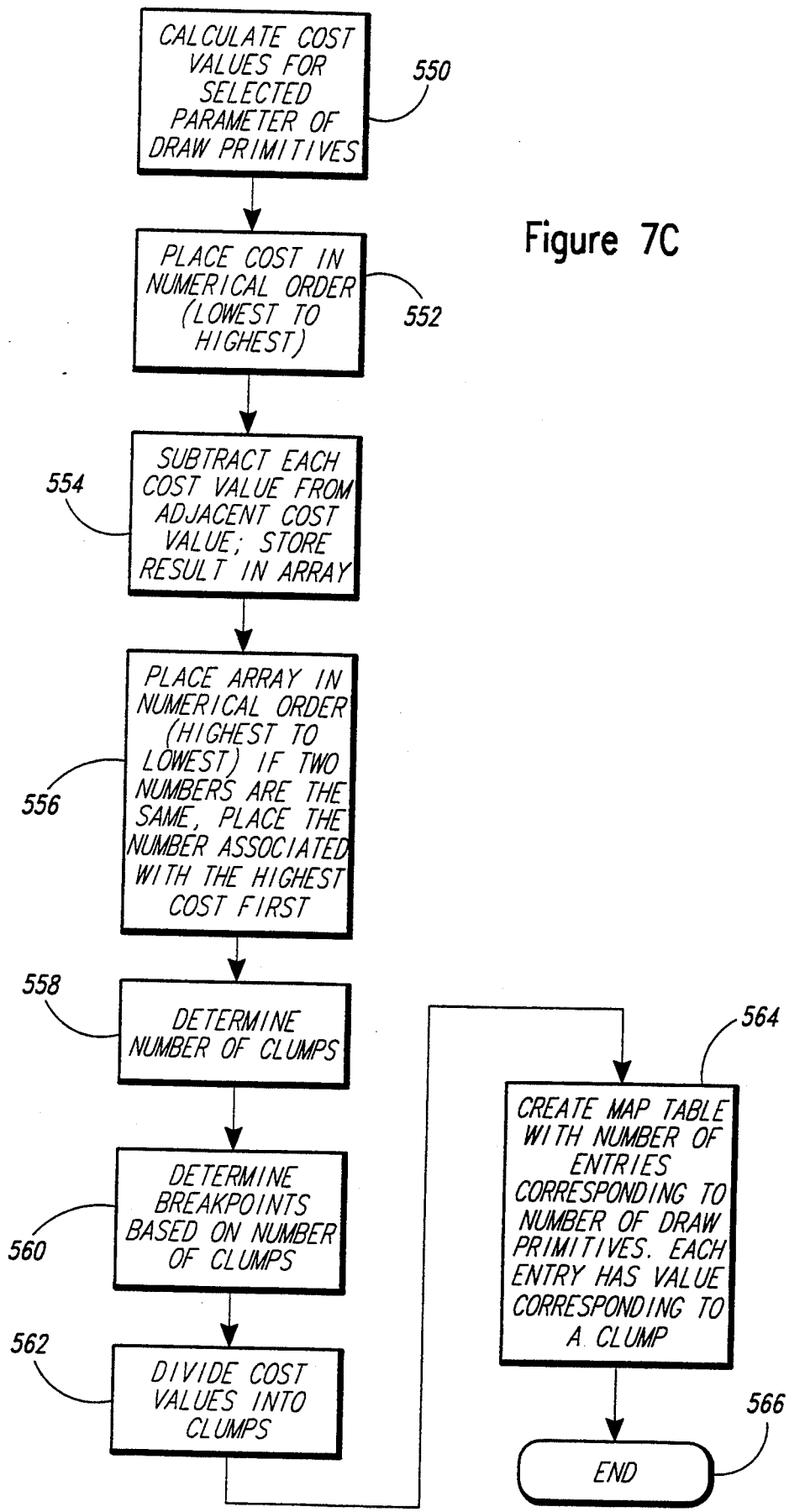
FIG. 7C is a flowchart of the operation of the system of FIG. 2 used to classify costs.

The flow chart of FIG. 7C illustrates the process of classifying cost values. In step 550, the system calculates cost values for a selected parameter of draw primitives. In step 552, the system 200 places the calculated cost values in numerical order from lowest to highest. In step 554, the system subtracts each cost from the adjacent cost value and stores the result in an array. In step 556, the system 200 places the array in numerical order from highest to lowest. It should be noted that if two numbers are the same, the system 200 places the number associated with the highest cost first. In step 558, the system determines the number of clumps into which the costs will be divided. As previously discussed, the number of clumps is variable and is selected to minimize the amount of error. In step 560, the system 200 determines the break points based on the number of clumps. For example, if step 558 determines that there will be three clumps, there will be two break points which are indicated by the first two values in the array arranged in numerical order from highest to lowest. In step 562, the system divides the cost values into the predetermined clumps. In step 564, the system 200 creates a map table with a number of entries corresponding to the number of draw primitives. Each entry has a value corresponding to a clump. The system 200 ends the classification process in step 566. Thus, the system 200 can reduce the overall storage requirements by classifying the data in the log file 260 (see FIG. 5) and creating cost tables 262. The map tables, 264, provide a convenient access means to the cost tables, 262.

Figure 7D:
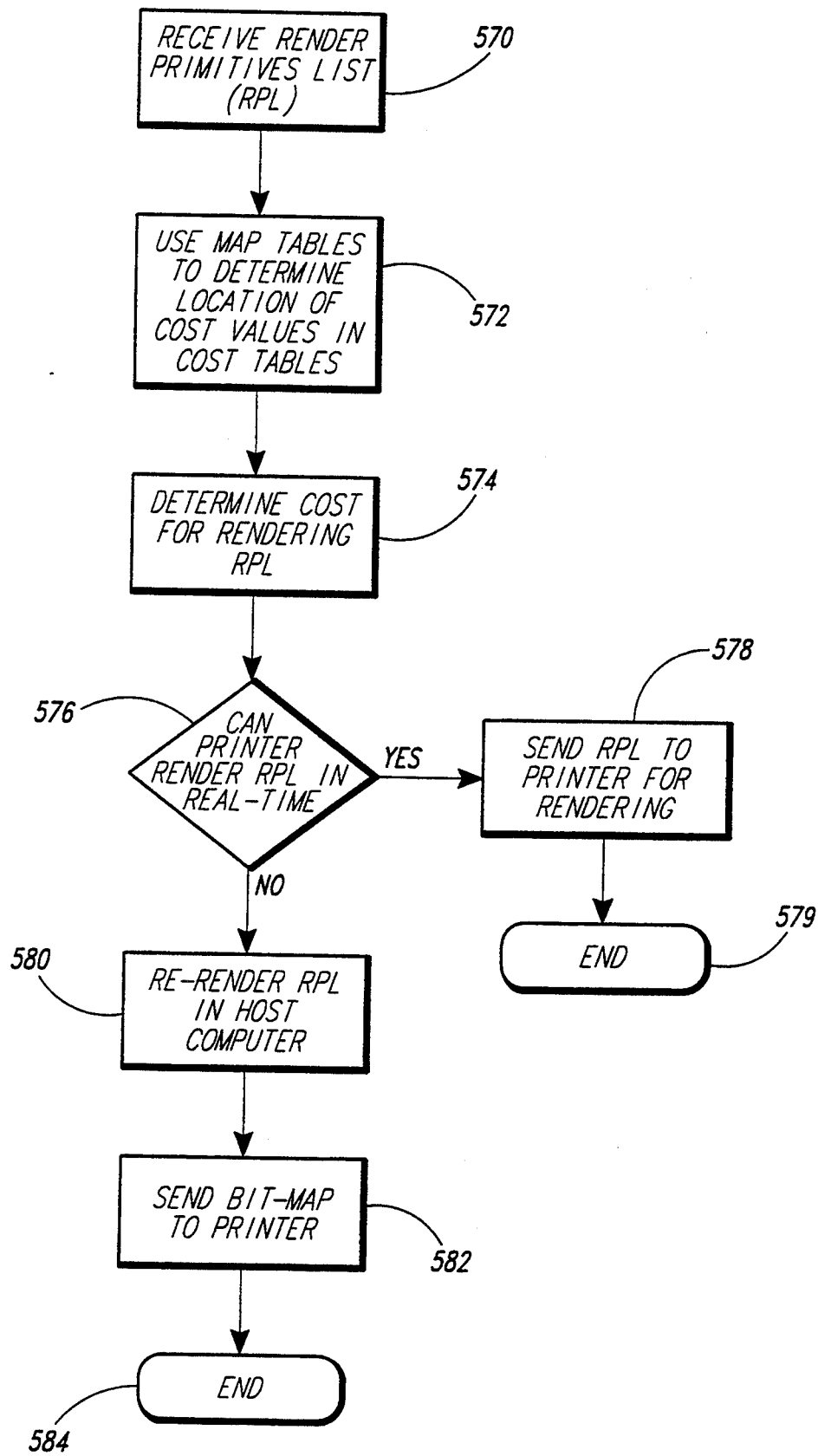
FIG. 7D is a flowchart of the operation of the system of FIG. 2 used to determine which portion of the system will process printer data.

The flow chart of FIG. 7D illustrates the use of the cost tables in determining a rendering cost for an RPL. In step 570, the resource assembler 208 (see FIG. 5) receives the render primitive list. In step 572, the resource assembler uses the map tables to determine the location of cost values within the cost tables. In step 574, the system 200 determines the cost for rendering an RPL. In decision 576, the system 200 determines whether the printer 218 (see FIG. 2) can render the RPL in real time. As previously discussed, the ability of the printer 218 to render an RPL in real time depends on many factors such as the computing power of the printer 218, the size of the printer memory 222, and the complexity of the RPL itself. If the printer can render the RPL in real time the result of decision 576 is YES. In that event, in step 578, the host computer 202 (see FIG. 2) sends the RPL to the printer 218 for rendering, and the system 200 ends the processing of the RPL in step 579. If the printer cannot render the RPL in real time, the result of decision 576 is NO. In that event, the host computer 202 pre-renders the RPL in step 580. In step 582, the host computer sends the pre-rendered bit map to the printer, and the system 200 ends the processing of the RPL in step 584. Thus the system 200 provides a means for analyzing the relative complexity of the draw primitives and the ability of the printer to render the draw primitives so as to maximize the efficiency of computing power in both the host computer 202 (see FIG. 2) and the printer 218.

Figure 7E:
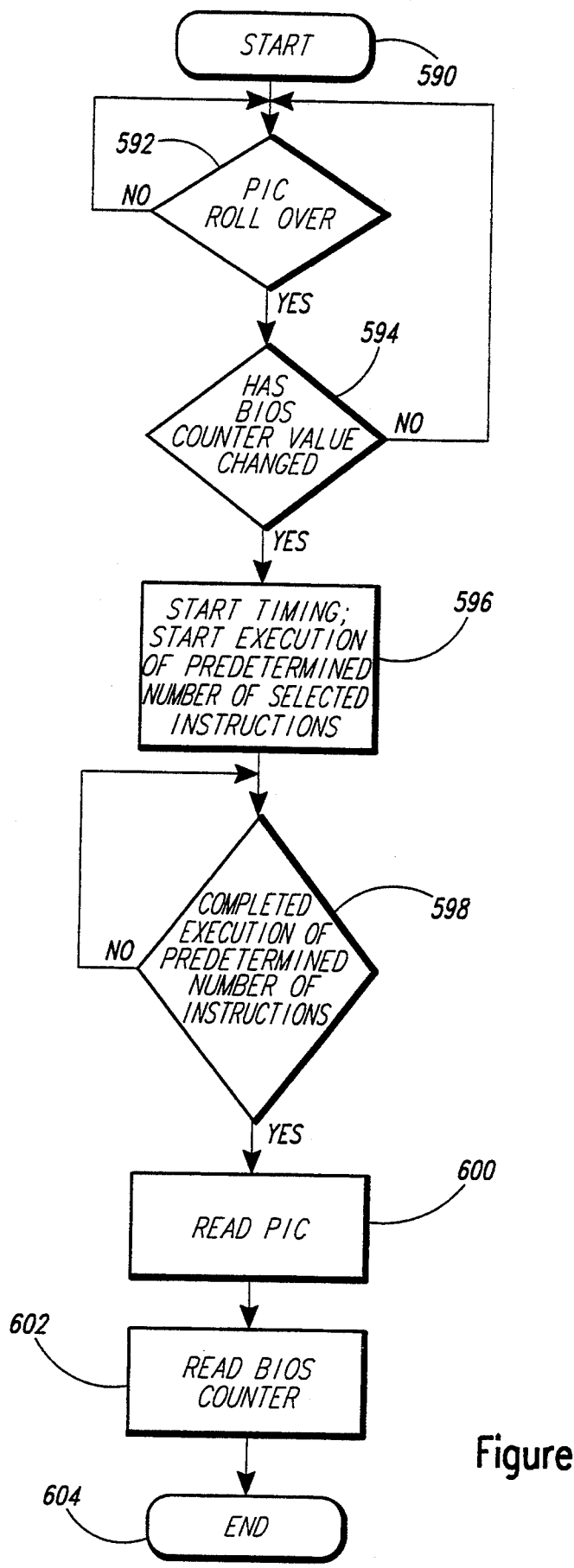
FIG. 7E is a flowchart of the operation of the system of FIG. 2 used for timer operation.

The operation of the timer is illustrated in the flow chart of FIG. 7E where the system 200 starts at step 590. In decision 592, the system 200 determines whether the PIC 402 (see FIG. 6) has rolled over. If the PIC has not rolled over, the result of decision 592 is NO and the system 200 returns to the start of decision 592. If the PIC has rolled over, the result of decision 592 is YES, and in decision 594, the system determines whether the BIOS counter has changed value. As is well known in the art, there may be a delay in processing the interrupt generated when the PIC rolls over. Therefore, it may be necessary to delay checking the value of the BIOS counter in decision 594 to compensate for such delays. If the BIOS counter value has not changed, the result of decision 594 is NO, and the system 200 returns to the start of decision 592. If the BIOS counter value has changed, the result of decision 594 is YES, and in step 596, the system starts timing the predetermined period and begins execution of a predetermined number of a selected draw primitive. As previously discussed, the evaluator module 254 (see FIG. 5) sends a predetermined number of draw primitives to assure that the predetermined time 410 is met. In decision 598, the system determines whether the predetermined number of instructions has been executed. If the predetermined number of instructions has not been executed, the result of decision 598 is NO and the system loops back to the beginning of decision 598. If the predetermined number of instructions has been executed, the result of decision 598 is YES and in step 600, the system 200 reads the programmable interval counter 402 (see FIG. 6). In step 602, the system reads the BIOS counter (designated as the clock storage area 408 in FIG. 6). The combination of the values contained within the PIC 402 and the clock storage area 408 indicate the elapsed time. As previously discussed the elapsed time is divided by the number of instructions executed in order to determine the cost for executing a single instruction. The system 200 ends the process of measuring elapsed time in step 604.

The above description has provided a detailed description of the application of the inventive system and method in which the printer operation has been analyzed. It is possible to use the same techniques to analyze the operation of the computer as it relates to printing. The inventive system and method are also useful in applications other than printing, as previously discussed.

It is to be understood that even though various embodiments and advantages of the present invention have been set forth in the foregoing description, the above disclosure is illustrative only, and changes may be made in detail and yet remain within the broad principles of the present invention. Therefore, the present invention is to be limited only by the appended claims.

What is claimed is:

1. A system for sharing data processing responsibilies between a host computer and a printer, the system comprising:

a test instruction set containing at least one draw primitive to be executed by the printer;

a timer to measure a predetermined elapsed period of time;

an evaluator module to measure the number of times that said draw primitive is executed during said elapsed period and determine an execution time for said draw primitive;

a printer model to receive said execution time and create a model of the printer to determine cost information for rendering said draw primitive;

a log file to receive and store said cost information for said draw primitive; and a resource assembler to receive said draw primitive and calculate a rendering cost for rendering said draw primitive in the printer by using said cost information from said log file, said resource assembler rendering said draw primitive if the printer cannot render said draw primitive in real-time, whereby the host computer and the printer share data processing responsibilities for rendering said draw primitive.

2. The system of claim 1, further including a set of cost tables to store classified cost data for said draw primitive, said draw primitive classified according to said cost information to reduce the storage requirements of said log file and simplify the process of determining said rendering cost by said resource assembler.

3. The system of claim 2, further including a set of map tables for said draw primitive, said map tables providing an pointer to a storage location within said cost tables where said classified cost data for said draw primitive is stored.

4. The system of claim 1 wherein said printer model selects a plurality of data values for said draw primitive, said evaluator module measuring said execution time for said draw primitive for each of said plurality of data values, said printer model using said execution time for said draw primitive for each of said plurality of data values to determine a general execution cost model for said draw primitive for any value of said data values.

5. The system of claim 4 wherein said plurality of data values comprises a plurality of first values for a first dimension for said draw primitive and a plurality of second values of a second dimension for said draw primitive, said evaluator module measuring said execution time for said draw primitive for each of said first and second values, said printer model using said execution time for said draw primitive for each of said first and second values to determine a general execution cost model for said draw primitive for any value of said first and second dimensions.

6. A system for sharing data processing responsibilities between a host computer and a printer, the printer using a set of user draw primitives to draw a plurality of objects on the printed page, the system comprising:

a test instruction set containing a set of predetermined test draw primitives to be executed by the printer, said test draw primitives selected from the set of user draw primitives;

a timer to measure a predetermined elapsed period of time;

an evaluator module to measure the number of times that each of said test draw primitives is executed during said elapsed period and determine an execution time for each of said test draw primitives;

a printer model to receive said execution times and create a model of the printer to determine cost information for rendering any one of the set of user draw primitives;

a log file to receive and store said cost information for the set of user draw primitives; and a resource assembler to receive a plurality of application draw primitives selected from the set of user draw primitives and calculate a rendering cost for rendering each said application draw primitives in the printer by using said cost information from said log file, said resource assembler rendering said application draw primitives if the printer cannot render said application draw primitives in real-time, whereby the host computer and the printer share data processing responsibilities for rendering said application draw primitives.

7. The system of claim 6, further including a set of cost tables to store classified cost data for groups of the set of user draw primitives, said groups of draw primitives classified according to said cost information to reduce the storage requirements of said log file and simplify the process of determining said rendering cost by said resource assembler.

8. The system of claim 7, further including a set of map tables for said user draw primitives, said map tables providing an pointer to a storage location within said cost tables where said classified cost data for a particular one of said user draw primitives is stored.

9. The system of claim 6 wherein said printer model selects a plurality of data values for each of said test draw primitives, said evaluator module measuring said execution time for each of said test draw primitives for each of said plurality of data values, said printer model using said execution time for each of said test draw primitives for each of said plurality of data values to determine a general execution cost model for each of said test draw primitives for any value of said data values.

10. The system of claim 9 wherein said plurality of data values comprises a plurality of first values for a first dimension for each of said test draw primitives and a plurality of second values of a second dimension for each of said test draw primitives, said evaluator module measuring said execution time for each of said test draw primitives for each of said first values and for each of said test draw primitives for each of said second values, said printer model using said execution time for each of said test draw primitives for each of said plurality of first and second values to determine a general execution cost model for each of the set of user draw primitives for any value of said first and second dimensions.

11. A system for determining instruction cost information in a printer connected to any host computer, the system comprising:

a test instruction set containing at least one draw primitive to be executed by the printer;

a timer to measure a predetermined elapsed period of time;

an evaluator module to measure the number of times that said draw primitive is executed during said elapsed period and determine cost information for executing said draw primitive; and a log file to receive and store said cost information for said draw primitive, whereby said cost information may be used to determine the cost of executing said draw primitive.

12. The system of claim 11 further including a set of cost tables to store classified cost data for said draw primitive, said draw primitive classified according to said cost information to reduce the storage requirements of said log file and simplify the process of determining a rendering cost for said draw primitive.

13. The system of claim 12, further including a set of map tables for said draw primitive, said map tables providing an pointer to a storage location within said cost tables where said classified cost data for said draw primitive is stored.

14. The system of claim 11 further including a printer model to select a plurality of data values for said draw primitive, said evaluator module measuring said execution time for said draw primitive for each of said plurality of data values, said printer model using said execution time for said draw primitive for each of said plurality of data values to determine a general execution cost model for said draw primitive for any value of said data values.

15. The system of claim 14 wherein said plurality of data values comprises a plurality of first values for a first dimension for said draw primitive and a plurality of second values of a second dimension for said draw primitive, said evaluator module measuring said execution time for said draw primitive for each of said first and second values, said printer model using said execution time for said draw primitive for each of said first and second values to determine a general execution cost model for said draw primitive for any value of said first and second dimensions.

16. A system for determining draw primitive cost information in a host computer and a printer, the printer using a set of user draw primitives to draw a plurality of objects on the printed page, the system comprising:
   a test instruction set containing a set of predetermined test draw primitives to be executed by the printer, said test draw primitives selected from the set of user draw primitives;
   a timer to measure a predetermined elapsed period of time;
   an evaluator module to measure the number of times that each of said test draw primitives is executed during said elapsed period and determine cost information for each of said test draw primitives; and
   a log file to receive and store said cost information for the set of user draw primitives.

17. The system of claim 16, further including a set of cost tables to store classified cost data for groups of the set of user draw primitives, said groups of draw primitives classified according to said cost information to reduce the storage requirements of said log file and simplify the process of determining said cost information.

18. The system of claim 17, further including a set of map tables for the set of user draw primitives, said map tables providing an pointer to a storage location within said cost tables where said classified cost data for a particular one of the set of user draw primitives is stored.

19. The system of claim 16, further including a printer model to select a plurality of data values for each of said test draw primitives, said evaluator module measuring said execution time for each of said test draw primitives for each of said plurality of data values, said printer model using said execution time for each of said test draw primitives for each of said plurality of data values to determine a general execution cost model for each of said test draw primitives for any value of said data values.

20. The system of claim 19 wherein said plurality of data values comprises a plurality of first values for a first dimension for each of said test draw primitives and a plurality of second values of a second dimension for each of said test draw primitives, said evaluator module measuring said execution time for each of said test draw primitives for each of said first values and for each of said test draw primitives for each of said second values, said printer model using said execution time for each of said test draw primitives for each of said plurality of first and second values to determine a general execution cost model for each of the set of user draw primitives for any value of said first and second dimensions.

21. A system using a host computer for determining instruction cost information, the system comprising:
   a test instruction set containing a set of predetermined test instructions to be executed by the host computer;
   a timer to measure a predetermined elapsed period of time;
   an evaluator module to measure the number of each of said test instructions executed during said elapsed period and determine an execution time for each of said test instructions; and
   a modeling module to select a plurality of values for a set of data inputs for each of said test instructions, said evaluator module measuring said execution time for each of said test instructions for each of said plurality of values of said set of data inputs, said modeling module using said execution time for each of said test instructions for each of said plurality of values of said set of data inputs to determine a general execution cost model for each of said test instructions for any value of said set of data inputs.

22. The system of claim 21, further including a log file to receive and store said general execution cost model for each of said set of test draw primitives, said log file being used to determine the cost of executing any of said test instructions using any values for said set of data inputs.

23. The system of claim 21 wherein said set of test instructions is a code module, said modeling module selecting a plurality of values for a set of data inputs for said code module, said evaluator module measuring said execution time for said code module for each of said plurality of values of said set of data inputs, said modeling module using said execution time for said code module for each of said plurality of values of said set of data inputs to determine a general execution cost model for said code module for any value of said set of data inputs.

24. A system for sharing data processing responsibilities between a printer and a host computer, the host computer having previously calculated cost information for the printer by using a set of draw primitives executed by the printer, a timer to measure a predetermined elapsed period of time, an evaluator module to measure the number of times each of the draw primitives is executed during said elapsed period and determine an execution time for each of the draw primitives, and a printer model to receive the execution times and create a model of the printer to determine cost information for rendering any one of the set of draw primitives, the system comprising:
   a log file containing the cost information for the set of draw primitives in a table; and
   a resource assembler to receive a plurality of application draw primitives selected from the set of draw primitives and determine a rendering cost for rendering each said application draw primitives in the printer using said log file, said resource assembler rendering said application draw primitives if the printer cannot render said application draw primitives in real-time, whereby the host computer and the printer share data processing responsibilities for rendering said application draw primitives.

25. The system of claim 24, further including a set of cost tables to store classified cost data for groups of the set of draw primitives, said groups of draw primitives classified according to the cost information to reduce the storage requirements of said log file and simplify the process of determining said rendering cost by said resource assembler.

26. The system of claim 25, further including a set of map tables for the set of draw primitives, said map tables provided a pointer to a storage location within said cost tables where said classified cost data for a particular one of the set of draw primitives is stored.

27. A system for sharing data processing responsibilities between a printer and a host computer, the host computer having previously calculated cost information for at least one draw primitive executed by the printer, a timer to measure a predetermined elapsed period of time, an evaluator module to measure the number of times the draw primitive is executed during said elapsed period and determine an execution time for the draw primitive, and a printer model to receive the execution time and create a model of the printer to determine cost information for rendering the draw primitive, the system comprising:
  a log file containing the cost information for the draw primitive in a table; and
  a resource assembler to receive at least one application draw primitive selected from the set of draw primitives and determine a rendering cost for rendering each said application draw primitives in the printer using said log file, said resource assembler rendering said application draw primitives if the printer cannot render said application draw primitives in real-time, whereby the host computer and the printer share data processing responsibilities for rendering said application draw primitives.

28. A timer for measuring the execution time of a set of computer software instructions on a computer, comprising:
  an oscillator generating timing pulses;
  a programmable interval timer receiving said timing pulses and periodically toggling an interrupt line to the computer, said timer containing a register to hold a current counter value;
  a clock storage area storing the number of interrupts generated by said timer;
  a first access means for accessing said clock storage area to determine said number of interrupts generated by said timer;
  a second access means for accessing said register to determine said current counter value;
  a check means for determining if an interrupt is generated when said timer periodically toggles said interrupt line;
  a predetermined resolution time to indicate the desired resolution of execution time measurement by executing the same set of computer instructions repeatedly until said resolution time expires; and
  a divider dividing the number of the sets of computer instructions executed during said resolution time by an elapsed time as measured by said first and second access means to determine the execution time for one set of computer instructions.

29. The system of claim 28, further including means for altering said resolution time to alter the desired resolution of said execution time measurement.

30. A method of determining the cost of executing instructions in a printer coupled to a host computer, the method comprising the steps of:
  (a) executing a test instruction set on the printer, said test instruction set containing at least one draw primitive;
  (b) repeatedly executing each of said draw primitives for at least a predetermined period of time;
  (c) measuring an elapsed period at least as great as said predetermined period using a timer, said elapsed period including the time required to complete execution of a draw primitive that may be executing at the end of said predetermined period;
  (d) determining an execution time for each of said draw primitives by dividing said elapsed period by the number of times that each of said draw primitives was executed during said elapsed period;
  (e) creating a model of the printer using said execution times, said model containing cost information for rendering any one of said draw primitives;
  (f) storing said cost information for each of said draw primitives in a log file;
  (g) receiving a plurality of application draw primitives; and
  (h) calculating a rendering cost for rendering each said application draw primitives in the printer by using said cost information from said log file.

31. The method of claim 30 wherein said step of creating a printer model includes the steps of:
  (1) selecting a plurality of data values for said draw primitive;
  (2) measuring said execution time, using said evaluator module, for said draw primitive for each of said plurality of data values; and
  (3) using said execution times for said draw primitive for each of said plurality of data values to determine a general execution cost model for said draw primitive for any value of said data value.

32. The method of claim 31 wherein said plurality of data values comprises a plurality of values for a first dimension for said draw primitive and a plurality of values of a second dimension for said draw primitive, whereby said general execution cost model provides cost information for said draw primitive for any value of said first and second dimensions.

33. The method of claim 30, further including the step of:
  (i) rendering said application draw primitives within the host computer if the printer cannot render said application draw primitives in real-time.

34. The method of claim 33, further including the steps of:
  (1) classifying said cost information according to said cost information for groups of said draw primitives; and
  (2) storing said classified cost information in a set of cost tables to store classified cost data to simplify the process of determining said rendering cost.

35. The method of claim 34, further including the step of creating a set of map tables for said draw primitives to provide a pointer to a storage location within said cost tables where said classified cost data for a particular one of said draw primitives is stored.

36. A method of determining the cost of executing instructions in a printer coupled to a host computer, the printer using a set of user draw primitives to draw a plurality of objects on the printed page, the method comprising the steps of:

(a) executing a test instruction set on the printer, said test instruction set containing test draw primitives selected from the set of user draw primitives;

(b) repeatedly executing each of said test draw primitives for at least a predetermined period of time;

(c) measuring an elapsed period at least as great as said predetermined period using a timer, said elapsed period including the time required to complete execution of one of said test draw primitives that may be executing at the end of said predetermined period;

(d) determining an execution time for each of said test draw primitives by dividing said elapsed period by the number of times that each of said test draw primitives was executed during said elapsed period;

(e) creating a model of the printer using said execution times, said model containing cost information for rendering any one of the set of user draw primitives;

(f) storing said cost information in a log file;

(g) receiving a plurality of application draw primitives selected from the set of user draw primitives; and (h) calculating a rendering cost for rendering each said application draw primitives in the printer by using said cost information from said log file.

37. The method of claim 36, further including the step of:

(i) rendering said application draw primitives within the host computer if the printer cannot render said application draw primitives in real-time.

38. The method of claim 36, further including the steps of:

(1) classifying said cost information according to said cost information for groups of draw primitives from the set of user draw primitives; and (2) storing said classified cost information in a set of cost tables to store classified cost data to simplify the process of determining said rendering cost.

39. The method of claim 38, further including the step of creating a set of map tables for the draw primitives from the set of user draw primitives to provide a pointer to a storage location within said cost tables where said classified cost data for a particular one of the draw primitives is stored.

40. The method of claim 36 wherein said step of creating a printer model includes the steps of:

(1) selecting a plurality of data values for said test draw primitives;

(2) measuring said execution time, using said evaluator module, for said test draw pimitives for each of said plurality of data values; and (3) using said execution times for said test draw primitives for each of said plurality of data values to determine a general execution cost model for said test draw primitives for any value of said data value.

41. The method of claim 40 wherein said plurality of data values comprises a plurality of values for a first dimension for said test draw primitives and a plurality of values of a second dimension for said test draw primitives, whereby said general execution cost model provides cost information for said test draw primitives for any value of said first and second dimensions.

42. A method of determining the cost of executing instructions in a printer coupled to a host computer, the method comprising the steps of:

(a) executing a test instruction set on the printer, said test instruction set containing at least one draw primitive;

(b) repeatedly executing each of said draw primitives for at least a predetermined period of time;

(c) measuring an elapsed period at least as great as said predetermined period using a timer, said elapsed period including the time required to complete execution of a draw primitive that may be executing at the end of said predetermined period;

(d) determining an execution time for each of said draw primitives by dividing said elapsed period by the number of times that each of said draw primitives was executed during said elapsed period;

(e) creating a model of the printer using said execution times, said model containing cost information for rendering any one of said draw primitives; and (f) storing said cost information for each of said draw primitives in a log file.

43. The method of claim 42, further including the steps of:

(1) classifying said cost information according to said cost information for groups of said draw primitives; and (2) storing said classified cost information in a set of cost tables to store classified cost data to simplify the process of determining said rendering cost.

44. The method of claim 43, further including the step of creating a set of map tables for said draw primitives to provide a pointer to a storage location within said cost tables where said classified cost data for a particular one of said draw primitives is stored.

45. The method of claim 42 wherein said step of creating a printer model includes the steps of:

(1) selecting a plurality of data values for said draw primitive;

(2) measuring said execution time, using said evaluator module, for said draw primitive for each of said plurality of data values; and (3) using said execution times for said draw primitive for each of said plurality of data values to determine a general execution cost model for said draw primitive for any value of said data value.

46. The method of claim 45 wherein said plurality of data values comprises a plurality of values for a first dimension for said draw primitive and a plurality of values of a second dimension for said draw primitive, whereby said general execution cost model provides cost information for said draw primitive for any value of said first and second dimensions.

47. A method of analyzing the cost of executing instructions in a printer coupled to a host computer, the printer using a set of user draw primitives to draw a plurality of objects on the printed page, the method comprising the steps of:

(a) executing a test instruction set on the printer, said test instruction set containing test draw primitives selected from the set of user draw primitives;

(b) repeatedly executing each of said test draw primitives for at least a predetermined period of time;

(c) measuring an elapsed period at least as great as said predetermined period using a timer, said elapsed period including the time required to complete execution of one of said test draw primitives that may be executing at the end of said predetermined period;

(d) determining an execution time for each of said test draw primitives by dividing said elapsed period by the number of times that each of said test draw primitives was executed during said elapsed period;

(e) creating a model of the printer using said execution times, said model containing cost information for rendering any one of the set of user draw primitives; and (f) storing said cost information in a log file.

48. The method of claim 47, further including the steps of:

(1) classifying said cost information according to said cost information for groups of draw primitives from the set of user draw primitives; and (2) storing said classified cost information in a set of cost tables to store classified cost data to simplify the process of determining said rendering cost.

49. The method of claim 48, further including the step of creating a set of map tables for the draw primitives from the set of user draw primitives to provide a pointer to a storage location within said cost tables where said classified cost data for a particular one of the draw primitives is stored.

50. The method of claim 47 wherein said step of creating a printer model includes the steps of:

(1) selecting a plurality of data values for said test draw primitives;

(2) measuring said execution time, using said evaluator module, for said test draw primitives for each of said plurality of data values; and (3) using said execution times for said test draw primitives for each of said plurality of data values to determine a general execution cost model for said test draw primitives for any value of said data value.

51. The method of claim 50 wherein said plurality of data values comprises a plurality of values for a first dimension for said test draw primitives and a plurality of values of a second dimension for said test draw primitives, whereby said general execution cost model provides cost information for said test draw primitives for any value of said first and second dimensions.

52. A method for using a host computer to analyze the cost of executing computer instructions, the method comprising the steps of:

(a) repeatedly executing each of a set of predetermined test instructions for at least a predetermined period of time;

(b) measuring an elapsed period at least as great as said predetermined period using a timer, said elapsed period including the time required to complete execution of one of said set of predetermined test instructions that may be executing at the end of said predetermined period; and (c) determining an execution time for each of said set of predetermined test instructions by dividing said elapsed period by the number of times that each of said of test instructions was executed during said elapsed period.

53. The method of claim 52, further including the step of:

(d) creating a model of the data processing by selecting a plurality of data values for said set of predetermined test instructions and using said execution times for said plurality of data values, said model containing cost information for rendering any one of said set of predetermined test instructions for any value of said data values.

54. The method of claim 53, further including the step of:

(e) storing said cost information in a log file, said log file being used to determine the cost of executing any of said set of predetermined test instructions.

55. The method of claim 52 wherein said set of test instructions is a code module, said steps (a)-(c) repeatedly executing said code module, measuring an elapsed period including the time required to complete execution of code module that may be executing at the end of said predetermined period, determining an execution time for said code module.

56. The method of claim 55, further including the step of creating a model of said code module by selecting a plurality of data values for said code module and using said execution times, said model containing cost information for rendering said code module for any of said plurality of data values.

57. A method of analyzing the data processing cost in a printer coupled to a host computer, the host computer having previously calculated cost information for the printer by using at least one of a set of draw primitives executed by the printer, a timer to measure a predetermined elapsed period of time, an evaluator module to measure the number of each of the draw primitives executed during the elapsed period and determine an execution time for each of the draw primitives, and a printer model to receive the execution times and create a model of the printer to determine cost information for rendering any one the set of draw primitives, and storing the cost information in a log file, the method comprising the steps of:

(a) receiving a plurality of application draw primitives selected from the set of draw primitives; and (b) determining a rendering cost for rendering said application draw primitives in the printer by using the log file containing the cost information for the set of draw primitives.

58. The method of claim 57, further including the step of rendering said application draw primitives within the host computer if the printer cannot render said application draw primitives in real-time, whereby the host computer and the printer share data processing responsibilities for rendering said application draw primitives.

59. The method of claim 57 wherein said step of determining said rendering cost uses a set of cost tables instead of the log file, said cost tables containing the cost information sorted according to the cost information for groups of the set of draw primitives to simplify the process of determining the cost for any of the set of draw primitives.

60. The method of claim 59 wherein said step of determining said rendering cost uses a set of map tables, said map tables containing a pointer to a storage location within said cost tables where said classified cost data for a particular one of the set of draw primitives is stored.

61. A method of using an internal timer on a computer for measuring the execution time of a computer instruction on the computer, the method comprising the steps of:

(a) generating timing pulses with an oscillator in the computer;

(b) periodically toggling an interrupt line to the computer when a programmable interval timer, containing a counter value register to hold a current counter value and receiving said timing pulses, has a value of zero for said counter value register;

(c) storing the number of interrupts generated during a selected time period;

(d) accessing said clock storage area to determine said number of interrupts generated by said timer during said selected period;

(e) accessing said counter value register to determine said current counter value;

(f) determining if an interrupt is generated when said timer periodically toggles said interrupt line;

(g) determining a resolution time to indicate the desired accuracy of execution time measurement by executing the same computer instruction repeatedly until said resolution time expires;

(h) counting a number of times the computer instruction is executed by the computer during said resolution time; and (i) dividing said number by an elapsed time as measured by said clock storage area and said current counter value to determine the execution time of the computer instruction.

62. The method of claim 61, further including the step of altering said resolution time to achieve a different accuracy of the execution time.

63. A method of determining the amount of time required to execute a computer instruction, the method comprising the steps of:

(a) reading a current counter value in a programmable interval counter which is designed to periodically toggle an interrupt to a central processor unit;

(b) reading a clock storage area when said counter toggles said interrupt line to determine if an interrupt was generated, said clock storage area being incremented at each of said interrupts;

(c) executing a plurality of the same computer instruction starting at the time said interrupt was generated and continuing to execute said plurality of the same computer instruction for at least a predetermined period of time as measured by said counter and the value in said clock storage area;

(d) counting a number of said plurality of of the same computer instruction executed during said elapsed time, said number including an extra one of said plurality of the same computer instruction which may be currently executing at the time said predetermined time expires;

(e) reading said current counter value and said clock storage area when said predetermined time expires or when said extra one of said plurality of the same computer instruction completes execution, to determine an elapsed time for executing said number of said plurality of the same computer instruction executed; and (f) determining an execution time for one of said computer instructions by dividing said elapsed time by said number.

64. The method of claim 63, further including the step of altering said predetermined period to achieve a different accuracy of the execution time.

65. A system for determining an instruction execution time in a printer coupled to a host computer, the system comprising:

a test instruction set containing at least one draw primitive to be executed by the printer;

a timer to measure a predetermined elapsed period of time;

an evaluator module to measure the number of times that said draw primitive is executed during said elapsed period and determine an execution time for said draw primitive; and a log file to receive and store said execution time for said draw primitive.

66. The system of claim 65 wherein the host computer determines if the printer can render said draw primitive in real-time, the host computer rendering said draw primitive if the printer cannot render said draw primitive in real-time, whereby the host computer and the printer share data processing responsibilities for rendering said draw primitive.

67. The system of claim 65, further including a printer model to select a plurality of data values for said draw primitive, said evaluator module measuring said execution time for said draw primitive for each of said plurality of data values, said printer model using said execution time for said draw primitive for each of said plurality of data values to determine a general execution cost model for said draw primitive for any value of said data values.

68. The system of claim 67 wherein said plurality of data values comprises a plurality of first values for a first dimension for said draw primitive and a plurality of second values of a second dimension for said draw primitive, said evaluator module measuring said execution time for said draw primitive for each of said first and second values, said printer model using said execution time for said draw primitive for each of said first and second values to determine a general execution cost model for said draw primitive for any value of said first and second dimensions.

69. A system for sharing data processing responsibilities by a host computer and a printer, the system comprising:

a test instruction set containing at least one draw primitive to be executed by the printer;

a timer to measure a predetermined elapsed period of time;

an evaluator module to measure the number of times that said draw primitive is executed during said elapsed period and determine an execution time for said draw primitive;

a printer model to receive said execution time and create a model of the printer to determine cost information for rendering said draw primitive;

a log file to receive and store said cost information for said draw primitive; and a resource assembler to receive said draw primitive and calculate a rendering cost for rendering said draw primitive in the printer by using said cost information from said log file, said resource assembler determining if the printer can render said draw primitive in real-time and rendering said draw primitive if the printer cannot render said draw primitive in real-time, whereby the host computer and the printer share data processing responsibilities for rendering said draw primitive.

70. A timer for measuring the execution time of a computer software instruction executed on a computer, comprising:

an oscillator generating timing pulses;

a programmable interval timer receiving said timing pulses and periodically toggling an interrupt line to the computer, said timer containing a register to hold a current counter value;

a clock storage area storing the number of interrupts generated by said timer;

a first access means for accessing said clock storage area to determine said number of interrupts generated by said timer;

a second access means for accessing said register to determine said current counter value;

a check means for determining if an interrupt is generated when said timer periodically toggles said interrupt line;

a predetermined resolution time to indicate the desired resolution of execution time measurement by executing the same computer instruction repeatedly until said resolution time expires; and a divider dividing the number of times that the computer instruction executed during said resolution time by an elapsed time as measured by said first and second access means to determine the execution time of the computer instruction.

71. The system of claim 70, further including means for altering said resolution time to alter the desired resolution of said execution time measurement.

72. A method of determining the cost of executing instructions in a printer coupled to a host computer, the method comprising the steps of:
 (a) executing a test instruction set on the printer, said test instruction set containing at least one draw primitive;
 (b) repeatedly executing each of said draw primitives for at least a predetermined period of time;
 (c) measuring an elapsed period at least as great as said predetermined period using a timer, said elapsed period including the time required to complete execution of a draw primitive that may be executing at the end of said predetermined period; and
 (d) determining an execution time for each of said draw primitives by dividing said elapsed period by the number of times that each of said draw primitives was executed during said elapsed period.

73. The method of claim 72, further including the step of storing said cost information for each of said draw primitives in a log file.

74. A method of determining the amount of time required to execute a computer instruction, the method comprising the steps of:
 (a) reading a current counter value in a programmable interval counter which is designed to periodically toggle an interrupt to a central processor unit;
 (b) reading a clock storage area when said counter toggles said interrupt line to determine if an interrupt was generated, said clock storage area being incremented at each of said interrupts;
 (c) executing a plurality of the same computer instruction starting at the time said interrupt was generated and continuing to execute said plurality of the same computer instruction for at least a predetermined period of time as measured by said counter and the value in said clock storage area;
 (d) counting a number of said plurality of the same computer instruction executed during said elapsed time;
 (e) reading said current counter value and said clock storage area when said predetermined time expires to determine an elapsed time for executing said number of said plurality of the same computer instruction executed; and
 (f) determining an execution time for one of the computer instructions by dividing said elapsed time by said number.

75. The method of claim 74, further including the step of altering said predetermined period to achieve a different accuracy of the execution time.

* * * * *